United States Patent [19]

Salazar et al.

[11] Patent Number: 5,802,467
[45] Date of Patent: Sep. 1, 1998

[54] WIRELESS AND WIRED COMMUNICATIONS, COMMAND, CONTROL AND SENSING SYSTEM FOR SOUND AND/OR DATA TRANSMISSION AND RECEPTION

[75] Inventors: Joe Andrew Salazar, Lompoc, Calif.; Luis Molero-Castro, Madrid, Spain

[73] Assignee: Innovative Intelcom Industries, Lompoc, Calif.

[21] Appl. No.: 535,801

[22] Filed: Sep. 28, 1995

[51] Int. Cl.$^6$ .................................................. H04M 11/00
[52] U.S. Cl. .................... 455/420; 455/419; 340/825.72
[58] Field of Search ............................. 379/56, 102, 96, 379/58, 67; 455/89, 231, 420, 556, 566, 402

[56] References Cited

U.S. PATENT DOCUMENTS

| | | | |
|---|---|---|---|
| 4,338,492 | 7/1982 | Snopko | 179/2 |
| 4,349,701 | 9/1982 | Snopko | 179/2 TV |
| 4,356,509 | 10/1982 | Skerlos et al. | 358/85 |
| 4,377,729 | 3/1983 | Stacy | 179/2 TV |
| 4,392,022 | 7/1983 | Carlson | 179/2 TV |
| 4,414,432 | 11/1983 | Skerlos et al. | 179/2 TV |
| 4,427,847 | 1/1984 | Hofmann et al. | 179/2 TV |
| 4,456,925 | 6/1984 | Skerlos et al. | 358/85 |
| 4,465,902 | 8/1984 | Zato | 179/2 TV |
| 4,482,947 | 11/1984 | Zato et al. | 364/138 |
| 4,508,935 | 4/1985 | Mastromoro | 179/2 EA |
| 4,626,847 | 12/1986 | Zato | 340/825.56 |
| 4,718,112 | 1/1988 | Shinoda | 455/231 |
| 4,775,996 | 10/1988 | Emerson et al. | 379/56 |
| 4,855,746 | 8/1989 | Stacy | 341/176 |
| 4,999,622 | 3/1991 | Amano et al. | 340/825.72 |
| 5,138,649 | 8/1992 | Krisbergh et al. | 455/420 |
| 5,268,666 | 12/1993 | Michel et al. | 455/402 |
| 5,341,167 | 8/1994 | Guichard et al. | 348/14 |
| 5,369,685 | 11/1994 | Kero | 379/67 |
| 5,428,388 | 6/1995 | Von Bauer et al. | 455/556 |
| 5,481,595 | 1/1996 | Ohashi et al. | 379/67 |
| 5,584,054 | 12/1996 | Tyneski et al. | 455/565 |

FOREIGN PATENT DOCUMENTS

| | | | |
|---|---|---|---|
| 0133798 | 6/1988 | Japan | 379/56 |
| 429202 | 5/1991 | United Kingdom | 379/58 |

OTHER PUBLICATIONS

*Installation Manual—Jerrold Starfone® Two-Way Converters Impulse 7000 Series*, published by General Instrument, Jerrold Division, Technical Publications Department (Jun. 1988).

*Primary Examiner*—Dwayne D. Bost
*Assistant Examiner*—Myran K. Wyche
*Attorney, Agent, or Firm*—Sofer & Haroun, LLP

[57] ABSTRACT

An interactive microprocessor based wireless communication device includes sound and data transceivers, signal detection and coupling devices, signal conversion device, voice recording, playback and storage device, voice activated device, display device, touch screen or similar device, sensors, frequency generation device, sound detection and reproduction devices and power source to concurrently perform generalized two way wireless communications, command, control and sensing functions utilizing radio and infra-red frequency communication links. A microprocessor receives signals from the touch screen and generates a digital data, command/or control signal for transmission to external devices such as home appliances and remote sensors. The microprocessor also responds to voice signal commands received via microphone and a voice processor. The microprocessor uses this signal to generate data, command/or control signals for transmission to external devices such as telephone, paging and intercom systems. Sound signals may be stored in a voice recorder and playback IC for subsequent message processing and coupling to a transceiver and/or a speaker. Telephone ringer signals are generated by the microprocessor and are coupled to a ringer for audio output. In response to certain commands, the wireless communication device establishes a communication link with external devices using radio frequency or infra-red frequency transmission and/or reception. Sensor signals are created by sensors that can detect physical differential changes and that can convert the changes into measurements. These signals are coupled to the microprocessor for further processing, display and/or transmission.

34 Claims, 10 Drawing Sheets

| No. Keys Number | No. Keys | Default2 Keys Number | Default2 Keys | Default2 Operation | Default2 Code |
|---|---|---|---|---|---|
| | | | | Mode | |
| Default Operation Mod | Default Code | Clock 0 Width | Clock 1 Width | Pulse 1 Width | Length Of Shape of "1" |
| Shape Of "1" | Length of Shape of "0" | Shape of "0" | Length of Dependent Sequence | Constant Wave Cod | Length Of Signal |
| Constant High Level Code | Length Of Signal | Repetition Code | Simple Sequence Code | Simple Sequence Negation | Length Of Simple Sequence |
| Simple Sequence | Dependent Sequence Code Right | Dependent Sequence Code Left | Dependent Sequence Negation | Addition Code | Existing Keys |
| Dependent Sequence Generated | Sequence Repetition Code | Sequence Repetion Index | End of Message Code | | |
| | | | | | |
| | | | | | |
| | | | | | |

FIG. 6

WIRELESS AND WIRED COMMUNICATIONS, COMMAND, CONTROL AND SENSING SYSTEM FOR SOUND AND/OR DATA TRANSMISSION AND RECEPTION

FIELD OF THE INVENTION

The present invention relates to a wireless and wired communications, command, control and sensing system comprising a handset and base station, for the two way communication of sound, voice, and data with any appliance and/or apparatus capable of transmitting and/or receiving compatible sound, voice and data signals.

BACKGROUND OF THE INVENTION

Currently, there are prior art devices for remotely controlling appliances using infra-red (IR) signals. Further, there are prior art devices which offer communications using radio frequency (RF) signals. However, few devices effectively combine both technologies. For example, U.S. Pat. No. 5,138,649 discloses an apparatus that controls a television and conducts telephone functions through a cable television converter and a base unit that incorporates a telephone radio frequency transceiver and a modem that interfaces with the telephone line. This arrangement has disadvantages since current televisions and cordless telephone bases on the market do not have such converters and modems and are not likely to be retro-fitted. Secondly, there are many television owners that do not have television cable boxes.

Further, the disclosed apparatus also provides a means for communicating with infra-red signals in one direction only. It does not provide for the use of infra-red communications as an alternate or full backup system to the radio frequency communications link. As a result, the command and control of an infra-red sensor equipped apparatus is severely limited. Further still, in medical or industrial uses, where RF radiation is detrimental, this disclosed apparatus is placed at a significant disadvantage, if not impossible to use. In addition, the disclosed alternative of using radio frequency (RF) for audio signals only and infra-red frequency for one way communication of telephone control and data signals severely limits the utility of the apparatus: (1) it does not provide an IR data path from the base to the handset for control as required for full telephone operations and (2) it will not work in environments where the need for full two way data and/or voice transmission in the IR domain would be necessary.

Accordingly, it is an object of the present invention to provide full two way RF and IR communication links to all types of apparatus and/or appliances for home, business, medical or industrial use. Single RF or IR links or combinations of RF links and IR links for performing integrated functions would have significant advantages. The ability to communicate directly with an appliance or apparatus from a unified wireless and/or wired communications, command, control and sensing device, in either full two way RF or IR link modes and without having to use a converter with a modem or a stand alone base station as an interface, offers other major and significant advantages. Further, use of a base station independent of the handset to perform all communications, command, control and sensing functions offers convenient extended utility, reliability and availability. Also, optional use of the base station as a repeater extends the range at which the wireless communication link can be established and maintained. Use of the base station as an option for coupling frequency modulated signals onto an AC power line offers other advantages. None of these advantages are met with prior art portable telephone handsets having IR remote control since their utility is driven by the interface with a television apparatus and access to a television cable line or through severely limited telephone base station functions. Further, prior art devices can not perform full telephone operations in view of a lack of an IR telephone control signal return link to the handset to perform handshake functions.

It is another object of the present invention to provide a unified wireless and wired communications, command, control and sensing system, in the form of a remote handset, base station, or both, each having a generalized signal generating and control structure that can interlace sound, including voice, command and control data and sensing data. The signals can be transmitted and/or received over a broad frequency range and linked to any number of appliances and/or apparatus capable of receiving and/or transmitting compatible signals without the requirement for a modem which adds unnecessary complexity and cost. Signal generation and control that is completely under microprocessor control, based on a generalized software architecture, overcomes the limitations of the specific simple aggregation and utility of a remote control, television converter, and cordless telephone as embodied in the prior art.

It is still a further object of the invention to provide fully integrated signal generation capability in a broad frequency range, from radio to infra-red frequencies, so that the frequency selection can be better matched to the operating environment of the communications, command, control and sensing device. Under some conditions the option to select frequency transmission or reception in either a radio frequency or infra-red frequency greatly enhances opportunities to overcome environmental radiating problems. In some environments where radio frequency transmission may be detrimental to other operating devices, the option to transmit in the infra-red domain could be very beneficial. Similarly, where direct line of sight combined with reflecting surfaces still does not make infra-red transmission and reception practical, the use of a radio frequency capability is very beneficial. Being able to provide a backup signal link between radio frequency transmission or reception and infra-red transmission or reception could insure link connection should a particular component fail in either the radio frequency or infra-red circuits.

It is another object of the invention to provide a means for loading the microprocessor external memory of the handset or base station with updated or accessory programs and/or data bases. The loading can be accomplished via a telephone line, a telephone base unit transceiver, a personal computer, or an entertainment apparatus that operates in the RF and/or IR frequency domain and a communication link that can be established with the wireless communications, command, control and sensing device.

It is still another object of the invention to use a microprocessor and a generalized signal generation or control software to provide a flexible way to add accessory appliances or apparatuses without having to buy additional, non-compatible, hand-held remote control or other wireless communications devices. Many generations of products could be designed to take advantage of a known or adaptive inter-device communications protocol.

SUMMARY OF THE INVENTION

In accordance with the present invention, a wireless and wired communications, command, control and sensing system, in the form of a remote handset or base station, or both, is provided. Both the handset and the base station have similar components and function in substantially the same manner. The base station may have additional features, for example: it couples a frequency modulated signal to alternating current (AC) power line; it may be powered by an alternative alternating current (AC) signal and battery power sources; it may provide battery charging for the handset, and it may be coupled to public or private telephone lines. Both the handset and the base station contain a touch screen or similar touch sensitive device that when touched in at least one specific outlined area, provide the means for externally interacting with their respective microprocessors. This interaction initiates the execution of a software instruction set.

Both the handset and the base station have microprocessors to control all their internal operations. The handset and the base station microprocessors are configured to actuate internal circuits, make calculations, process data, generate and verify privacy codes for telephone communications, generate sound and/or data signals, control signal processing, control the reception and transmission of radio and/or infra-red frequency signals and activate access to public or private telephone networks. The microprocessors further provide programming and selecting modes of operation and functions. The microprocessors and associated software logically inter-relate data to generate information and general purpose command and control signals that can be received and processed by different external appliances or apparatus. The microprocessors further generate signals that are coupled to a ringer of a telephone or other apparatus for paging, and performing other coded audio alert functions.

Both the handset and the base station include a microphone. The microphones couple external sound signal, including voice signals, to a sound and data coupler for subsequent transmission via radio and/or infra-red frequency transceivers. The microphones further couple sound signals, including voice signals, to a voice recorder and player integrated circuit (IC) for storage and playback. The microphones further couple external voice command signals to a voice activated device IC.

Sound, voice, and/or data signals inputted via a microphone are sent to a sound and data coupler for transmission, output to a speaker, and/or for processing by the microprocessor. Recording, playback and storing of sound signals, including voice signals, is provided, under microprocessor control, for message operations. The sound or voice signals are inputted via a microphone in some applications or inputted via transceivers in other applications. The signals are retrieved and played back, under microprocessor control, via the speaker, and/or are coupled to the transceivers for transmission via radio or infra-red communication links.

Voice command and/or control signals which are input via the microphone are detected by a voice activated device. The signals are converted into digital signals for input to the microprocessor. This voice command generated input is used by the microprocessor for internal operations. It may also be converted into command and control signals for transmission via a radio frequency and/or infra-red transceiver to external appliances or apparatus.

Radio and/or infra-red transceivers transmit and receive radio frequency and/or infra-red frequency signals. Typical radio transceiver functions include signal detection, modulation, demodulation, amplification, and noise reduction through companding techniques. Carrier frequencies are provided by a frequency synthesizer which is controlled by the microprocessor. Digital to analog and analog to digital signal conversion is provided for signal processing and communication in both analog and digital form. Radio transceivers in the handset and the base station couple sound, including voice signals, data and control signals, to and/or from a data detector, signal converters, a sound and data coupler, a speaker and respective microprocessor. Radio signals are coupled to and from open space via an antenna. The infra-red transceiver couples sound signals, including voice, data and control signals to and/or from the data detector, signal converters, a sound and data coupler, a speaker and the microprocessor. Infra-red signals are coupled to and from open space via infra-red light emitting and detection devices. These transceivers establish radio and infra-red signal communication links with external appliances and/or apparatuses, including handset to base station and base station to handset, having compatible receiver and/or transmission capabilities.

Sensors embodied in the communications, command, control and sensing system detect physical phenomena differentials and convert these differentials into data signals. These data signals are coupled to microprocessors for further processing and output to a liquid crystal display device, or similar device, a ringer and/or the transceivers. The communication, command, control and sensing system further includes means for transmitting the data signals to an external monitoring apparatus. Sensor data from external appliances and/or apparatus is received by radio and/or infra-red transceivers in the handset or base station and are coupled to a corresponding microprocessor. The respective microprocessor processes the external sensor data and outputs it to the display device or re-transmits it to an appliance, apparatus or monitoring device in the form of data, information, and/or command and control signals.

The base station radio frequency transceiver further couples two way frequency modulated signals from and to alternating current (AC) power line for two way communication with other frequency modulation transceivers that are also coupled to alternating current (AC) power line.

The base station further couples voice and data signals to public and/or private telephone network.

The base station is further powered by direct current (DC) signal and an alternating current (AC) signal power source.

According to one aspect of the invention, command and control signals are initialized by touching a touch screen, or similar touch sensitive device. In response, the microprocessor generates data for actuating internal circuits and/or for causing changes in settings in external appliances and/or apparatuses. In another aspect of the invention, command and control signals are initialized by voice commands and are generated by a voice activation device. In response, the microprocessor generates data for actuating internal circuits and/or for causing changes in settings in external appliances and/or apparatuses. In both aspects, the communications, command, control and sensing system receives command and control signals that represent appliance and/or apparatus sensor status and/or measurement readings. The received data is processed by the respective microprocessor for display and/or automatic updates to command and control signals sent back to the external appliance and/or apparatus.

External appliance and/or apparatus functions are controlled in response to a radio or infra-red command and control signal generated and transmitted by the wireless communications, command, control and sensing system. Passive external appliances or apparatuses, equipped with compatible receivers and decoding circuits, receive the command and control signals. Signal processing electronics within the appliance or apparatus convert the received command and control signals into a switching or other form of operation. Active external appliances or apparatuses provide setting condition or status signals which are detected by internal sensors of the system. These setting condition or status signals are converted by a microprocessor, or other electronic circuit, into signals for transmission to the wireless communications, command, control and sensing system via a radio or infra-red communication link.

All communication links between the communications, command, control and sensing system and external appliances and/or apparatuses are wireless, except where the base station is coupled to a telephone line and an alternating current (AC) signal power line. These communication links are two way radio and/or infra-red links. For example, one external implementation comprises a door bell with intercom. The corresponding appliance control signal comprises an actuation command to establish a wireless radio frequency communications link between the door intercom and the handset and/or base station. A second external implementation comprises an audio alarm and a corresponding control signal, which is a radio and/or infra-red control signal link to activate a switch to power an alarm sound generator. A third external implementation comprises an alternating current remotely actuated switch, which receives a radio frequency coded command and powers up or changes the voltage setting in a house light or other device. A fourth implementation used within the handset and/or base station comprises a voice recorder and playback IC device, under the control of a microprocessor, for automatic and multiple message transmission to the base station for connection to a telephone line. A fifth implementation used within the handset and/or base station, comprises the reception of a message via the radio or infra-red transceiver and storage of the message for subsequent playback through the speaker, or re-transmission via the said transceivers. A sixth implementation used within the handset and/or base station, comprises receiving and processing remote sensor signals for displaying or processing by the microprocessor. A seventh external implementation comprises a generalized remote control data base driven signal generation for controlling entertainment appliances such as television, VCR, cable box and sound system. An eighth implementation comprises voice actuated command and control signal generation for internal operations and/or for remote control of external appliances. A ninth implementation comprises a sensor embodied within either the handset or base station, which senses temperature, pressure or some other externally measurable human body condition which is then converted and processed by the respective microprocessor into data for display or transmission along with a voice or other message. A tenth implementation comprises secure control signal generation and transmission to external appliances and/or apparatuses. An eleventh implementation comprises using the base station and/or handset microprocessor to perform programming functions, calculations and/or to execute specific application programs. A twelfth implementation comprises a wireless telephone operation between the handset and the base station which couples the signals to a private or public telephone network. A thirteenth implementation comprises coupling frequency modulated signals to and from alternating current (AC) signal power line. A fourteenth implementation comprises generation and processing of a generalized voice, command and control signal protocol which is transceived between the handset and/or base station and/or an external device capable of receiving, processing and responding to the signal.

BRIEF DESCRIPTION OF THE DRAWINGS

FIG. 6 is a block diagram illustrating a file structure corresponding to an array used for creating control signals in accordance with the invention.

DETAILED DESCRIPTION OF THE INVENTION

Figure 1A:
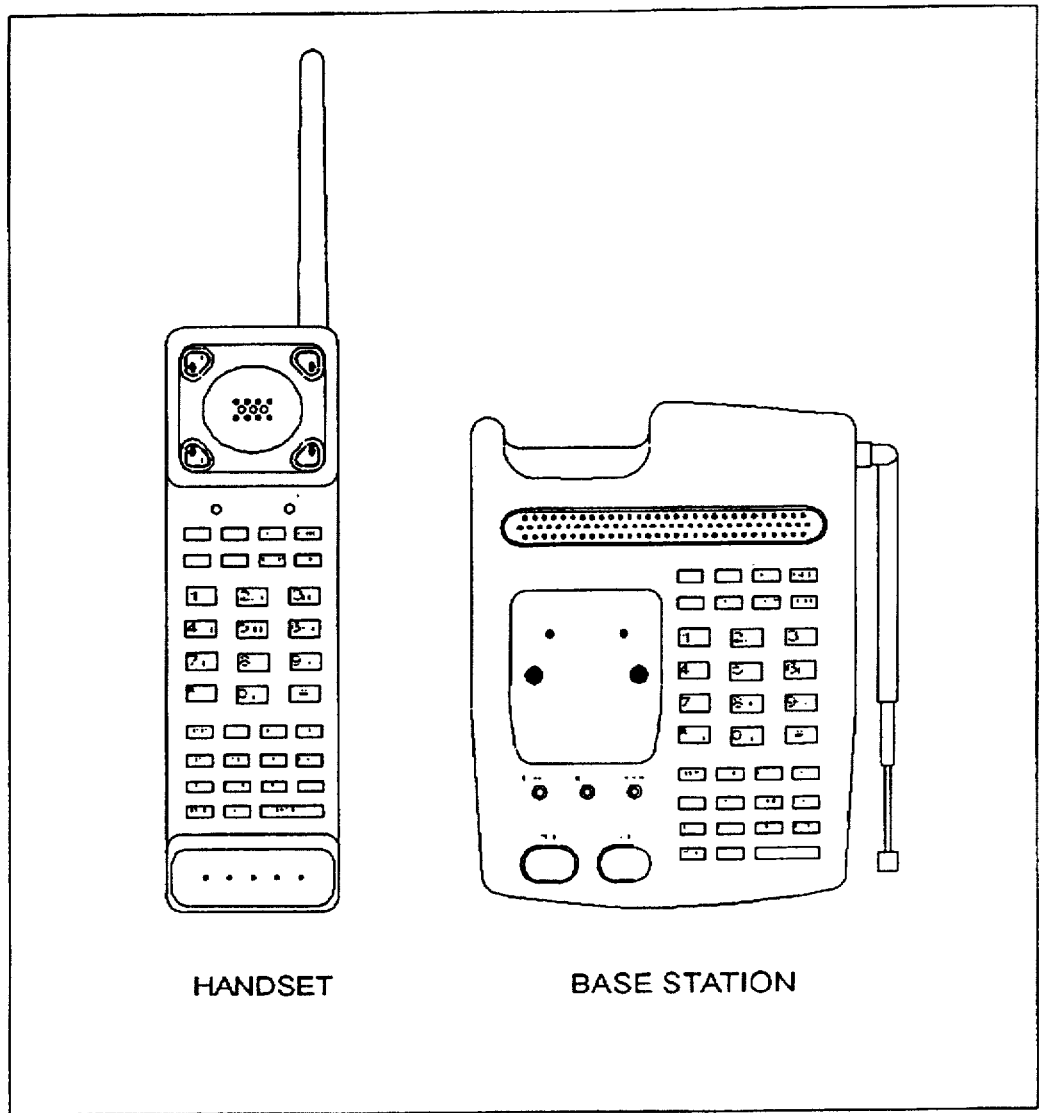
FIGS. 1a and 1b are block diagrams illustrating a wireless and wired communications, command, control and sensing system comprised of a handset and base station in accordance with the present invention and external appliances and/or apparatus for two way communication of sound, voice and data signals utilizing both radio frequency and infra-red frequency communication links.

FIG. 1a illustrates a wireless and wired communications, command, control and sensing system 1 including a handset device 10 and a base station 25 for two way communication of sound, voice, and data to perform telephone communications, remote command and control of appliances and/or apparatuses, remote monitoring, intercom and paging operations, and security functions utilizing both radio and infra-red frequencies.

Figure 1B:
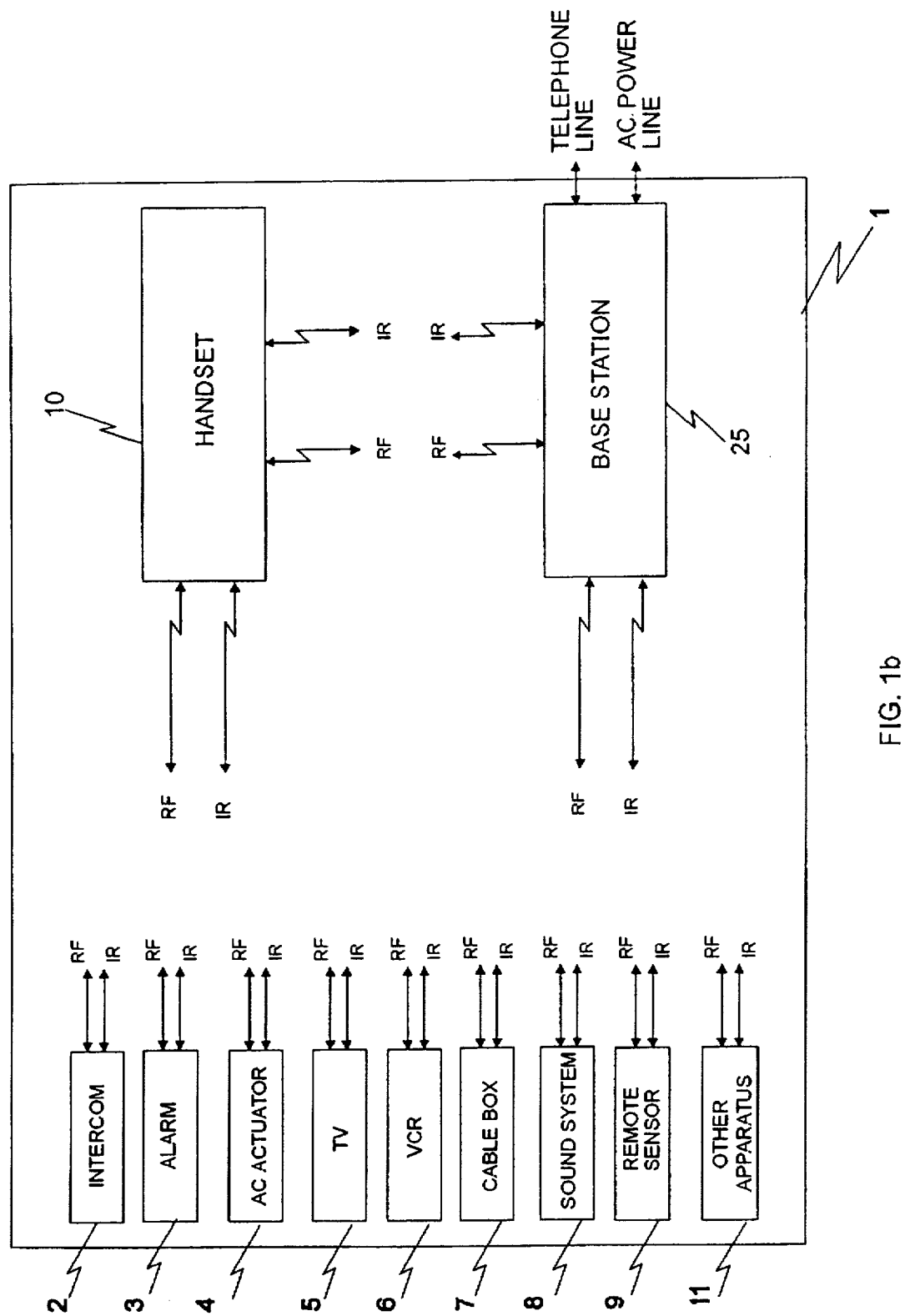

As illustrated in FIG. 1b, external appliances and/or apparatuses may include an intercom 2, an alarm 3, an alternating current (AC) actuator 4, a TV 5, a VCR 6, a cable box 7, a sound system 8, a remote sensor 9, or any other RF/IR apparatus 11. As shown, handset 10 may communicate directly to any of the external apparatuses or directly to a base station 25. Alternately, base station 25 may communicate directly with any of the external apparatuses or handset 10. Further still, handset 10 may communicate to an external apparatus through base station 25. Finally, base station 25 may communicate through a telephone line and/or an alternating current (AC) signal power line to any other apparatus having the ability to communicate through same.

Figure 2:
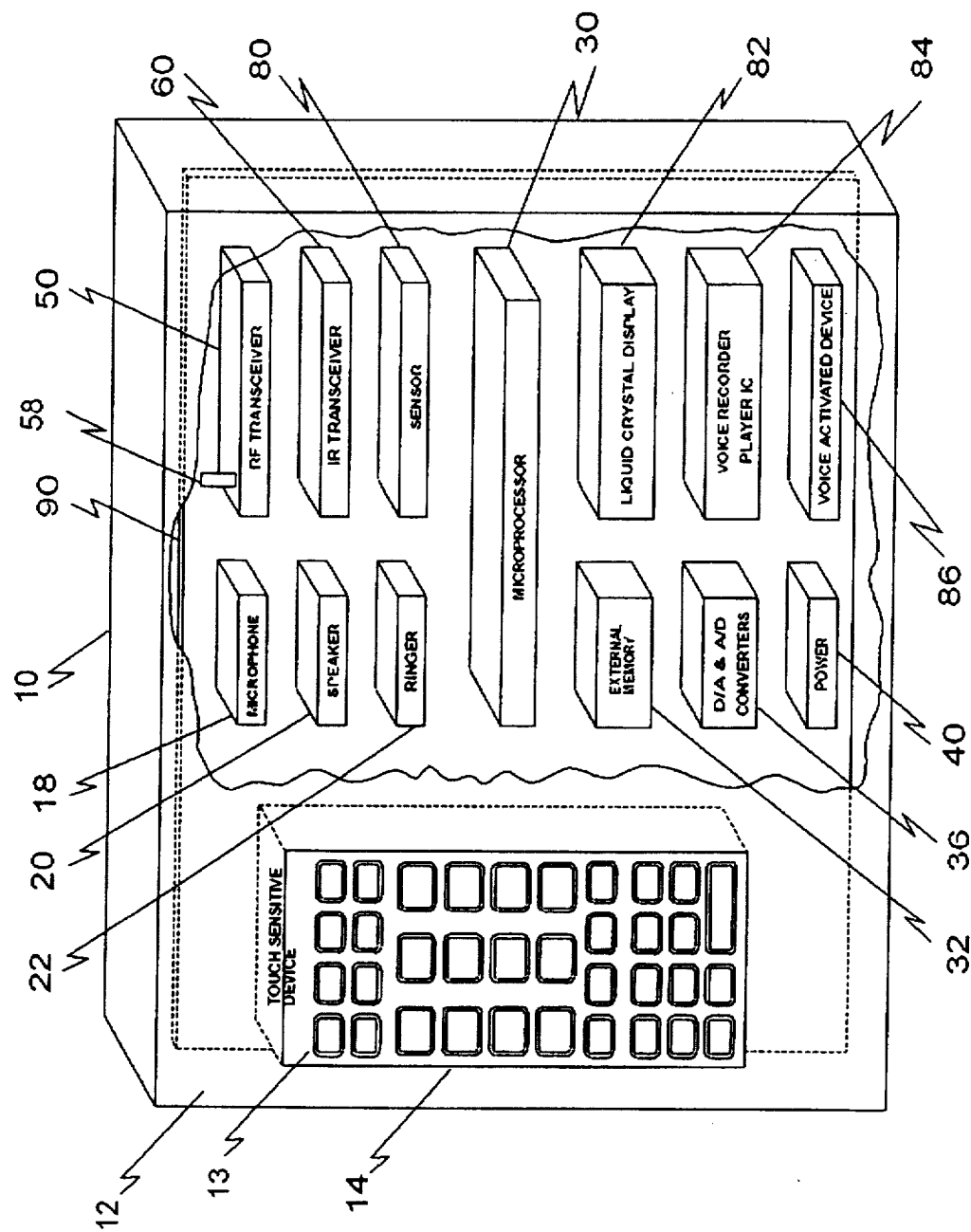
FIG. 2 is a perspective diagram view of a wireless communications, command, control and sensing handset device in accordance with the present invention.

FIG. 2 illustrates a wireless communications, command, control and sensing handset device 10, in an enclosure 12, that when interconnected via a printed circuit board 90 and controlled by a handset microprocessor 30, performs two way wireless communication, command, control and sensing functions. In one embodiment of the invention, a Motorolla 6805 processor is used. However, as will become readily apparent to those skilled in the art, other microprocessors can be used. A touch sensitive device, such as 14, with pressure, inductive, reactive, light or other physical reactions respond to an external touch and produces an input signal to microprocessor 30, which in turn processes the signal and generates data, command and/or control signals. As will become readily apparent to those skilled in the art, touch sensitive device 14 may be a key pad, an optical device, a capacitive or inductive reactive device, or any other type of available control devices. The touch sensitive device may be overlayed with different overlay 13, which allows for designating a different set of functions that may be executed by microprocessor. The microprocessor instruction set and data is stored in microprocessor 30 or in an external memory module 32, having preferably 16K byte memory capability. Selected data, command and/or control signals are displayed, in digital form, on a liquid crystal display 82 or similar display device. Two way sound and/or voice communication, including telephone communications, is controlled by microprocessor 30 via communication links enabled by radio frequency transceiver 50 and/or infra-red frequency transceiver 60.

Open architecture software within microprocessor 30 creates a generalized command and control protocol which makes it possible to interact, in a wireless mode, with any number of external devices that have compatible transceivers with wireless communications, command, control and sensing handset 10. The software also provides all the internal controls and necessary protocols for specified radio and infra-red communication links. Control signals created by these protocols allow the system to be used as a wireless telephone or as a remote controller for entertainment appliances or alarm systems or energy control systems or for personal security operations, etc. Microprocessor 30 provides all the timing via an internal or external clock. Data base updates and application programs can be down loaded into the microprocessor via the radio or infra-red communication links. Data base updates can also be made via the touch screen or touch sensitive device. The operation of the microprocessor in conjunction with creating the control signals to remotely communicate with external appliances and/or apparatus is explained in detail hereinafter.

One embodiment of handset 10, in accordance with the present invention, is configured to communicate with various devices such as TV sets, VCR sets, CD players, and Cable boxes. The handset is further configured to utilize several communication protocols employed by various manufacturers or various models of the same brand. Typically, each manufacturer of one of these devices such as TV sets, VCR sets, CD players and Cable boxes, employs a specific communication protocol that includes a command code set for performing various functions to remotely control the device. Each command code set comprises a set of signals, wherein each signal is utilized to perform an available function. For example, a TV set made by manufacturer A, may require a command code set that includes various signals to remotely control various available functions such as channel up, channel down, volume up, volume down, mute, and power "on" and "off". This command code set may have a different set of signals than another command code set employed for a TV set made by manufacturer B. In the alternative, manufacturer A may employ different command code sets for its own various models of TV sets.

It will be appreciated that a handset that is capable of communicating with substantially all major brands of various devices, or transmit infra red frequencies insulated with control signals ranging from 30–130 KHz, requires a substantially large memory to store all the command code sets with various sets of signals. For example, it is desirable to store approximately 270 different code sets that may be used by handset 10 to remotely communicate with major brand TV sets, VCR sets, CDS and Cable boxes. These devices are adapted to receive infra-red signals with frequencies ranging from 30–120 KHz. On the average, each command code set may contain about 20 signals, wherein each signal is used to perform a desired function. Assuming that the average length of a signal to be generated has a duration of one second, the required memory space to store all the signals for the desired command code sets may be calculated. Thus, since the average number of signals per command code set is 20, and there are about 270 command code sets, handset 10 may be required to store data that represents approximately 5400 infra-red signals at an average frequency of 100 KHz, each signal having an average duration of one second. Assuming a Nyquist sampling rate, each signal with a duration of one second may be represented by 200Kbits or approximately 25Kbytes of data. Thus, for 5400 infra-red signals, a memory space in an order of 135Mbyts of data is desirable. However, handset 10 may typically provide a memory space in an order of 10Kbytes of data. Thus, it is necessary to store the data corresponding to all desired command code sets at a compression ratio in the order to 13000:1 and preferably 15000:1.

Handset 10 in accordance with the present invention employs an encoding technique to store the desired signals in a memory space in the order of 10Kbytes of data. This encoding arrangement is explained in more detail hereinafter.

In order to substantially decrease the amount of memory necessary to store infra-red signals, microprocessor 30 in accordance with the present invention, retrieves data from a memory device, such as a RAM, ROM, EPROM or EEPROM, that is configured so as to store a finite set of parameters that may be used to recreate and generate signals corresponding to a desired command code set. These parameters take substantially less memory space than if the entire signal were to be stored.

As mentioned previously, each command code set includes a set of signals that may be employed to transmit a specific command to an infra-red receiver located in an electronic device that is being controlled. In one embodiment of microprocessor 30, in accordance with the present invention, each command code set is represented by parameters stored in an array comprising a set of variable fields that may vary in size depending on the amount of information stored in each field. These arrays are categorized as parent or root arrays and child or branch arrays. A parent array contains parameters that may be utilized to generate a set of infra-red signals that belong to a desired command code set. A child array, relates to its parent array, and is used to generate a different set of signals that belong to a different desired command code set. A child or branch array may store those parameters that are different from its parent array. A child array may not store those parameters that are substantially similar to those of its parent array. For such parameters, the child array retrieves the necessary information from the corresponding field in its parent array to generate the signals that belong to a command code set corresponding to this child array. This arrangement leads to a substantial reduction in memory space required to store parameters corresponding to various command code sets. Specifically, the savings in memory space increases with the number of child arrays corresponding to a parent array.

Furthermore, parent and child arrays may also refer to certain parameters in other arrays to generate some of the signals that are desired in conjunction with generating a command code set. Microprocessor 30 in accordance with the present invention may also be configured such that a set of signals belonging to a command code set may be generated by using parameters stored in one array, and remaining sets of signals belonging to the same command code set may be generated by using parameters stored in other arrays.

The above-described encoding technique is explained in more detail hereinafter in conjunction with FIG. 6, which illustrates the specific fields in each array, in accordance with one embodiment of the invention. However, the invention is not limited in scope in this respect. As mentioned previously, in a preferred embodiment these fields have a variable length to substantially minimize the use of memory space.

No Keys Number Field (4 Bits)

The first field in a parent or child array is identified as "no keys number". This field is four bits long. The information contained in this field refers to the number of keys that if pressed on handset 10, no signal generates. For example, some TV sets may not accommodate channel up and channel down commands. For these TV sets, a desired channel may be selected by pressing the appropriate channel number. Thus, for such a TV set, handset 10 preferably should not generate a signal when its channel up or channel down key is pressed. The no keys number field identifies the number of such keys that may not generate a signal, when pressed.

No Keys Field (Variable Length)

The next field in an array is identified as "no keys". This field has a variable length depending on the "no keys number" specified by a command code set. The information contained in this field identifies the keys on handset 10, that if pressed should not generate a signal. In accordance to one embodiment of the present invention, each key is represented by six bits. The three most significant bits indicate the row and the three least significant bits indicate the column of a key on handset 10. Thus the length of "no keys" field is substantially equal to "no keys number" multiplied by 6 bits. It will be appreciated that the length of "no keys" field is zero when "no keys number" has a value zero.

Default 2 Keys Number Field

The next field in an array is identified as "default 2 keys number". The information contained in this field represents the number of keys that when pressed, handset 10 generates a signal that does not belong to a command code set that is being currently generated. The purpose for this field is that in certain circumstances, while handset 10 is generating signals corresponding to a command code set to remotely control a device, it is also desired to generate signals that correspond to a command code set for remotely controlling another device, so that at least two devices are remotely controlled concurrently. For example, sometimes when handset 10 is configured to generate signals for controlling a TV set, it is desirable that handset 10 also generate signals for controlling some of the functions of a VCR set, even though the handset is configured to generate a TV command code set. For this particular example, the number of keys that generate VCR related signals, while handset 10 is also generating TV set related signals, is stored in default 2 keys number field.

Default 2 Keys Field (Variable Length)

The next field in the array is identified as "default 2 keys". This field has a variable length depending on the "default 2 keys number" specified by a command code set. The information contained in this field identifies the keys on handset 10, that if pressed would generate a signal created by referring to an array other than the one currently being retrieved from. In accordance with one embodiment of the present invention, each key is represented by six bits. The three most significant bits indicate the row and the three least significant bits indicate the column of a key on handset 10. Thus the length of "default 2 keys" field is substantially equal to "default 2 keys number" multiplied by 6 bits. It will be appreciated that the length of "default2 keys" field is zero when "default 2 keys number" has a zero value.

Default 2 Operation Mode Field (3 Bits)

The next field in the array is identified as default 2 operation mode. In one embodiment of handset 10 in accordance with the invention, this field may be present only when default 2 keys number has a value other than zero. In that event, the information in this field may be a 3 bits data word, representing the mode of operation for those keys on the handset that control a different device other than the one being controlled by the remaining keys. These modes of operation may be the types of devices that default 2 keys may control, such as TV mode, VCR mode, CD mode or CABLE mode.

Default 2 Code Field (8 Bits)

The next field in the array is identified as default 2 code. The information in this field identifies the array that contains the command code set information to be used for generating signals associated with default 2 keys. The length of this field is 8 bits, and, therefore, up to 255 different command code sets for each possible value of default 2 operation mode field may be retrieved for generating the desired signals corresponding to the default 2 keys. When default2 code is 255, handset 10 generates signals corresponding to the array currently being processed in the specific default 2 operation mode. In that event, the system does not refer to any other array.

Default Operation Mode Field (3 Bits)

The next field in the array identifies the default operation mode. This information represents the mode of operation for the keys on the handset that control a specific device. These modes of operation may be the types of devices that handset 10 may control, such as TV mode, VCR mode, CD mode or CABLE mode. The mode information indicates the type of command code set that may be generated for a selected array.

Default Code Field (8 Bits)

The next field in the array identifies the default command code set that relates to the present command code set that is being generated based on the information contained in the array. Typically, if the array being selected corresponds to a child array, the information in the default code field identifies the parent array from which additional information may be retrieved to generate the signals corresponding to this child array. As will be explained in more detail with reference to specific fields contained in a parent array, the information necessary to create the signals for a child command code set are stored in a parent array corresponding to the child array. This information may include the clocking and pulse characteristics of the signals that are common among a parent and all of its children arrays.

In certain circumstances not all of the information between a child array and its parent are common. Thus, if microprocessor 30 does not find information in a specific field in the child array, it locates the default command code set, which identifies the parent array corresponding to the child array and retrieves the information from the parent array. If, however, microprocessor 30 finds the information in the child array being selected, it creates the necessary signals based on the information located in the child array, without reverting back to the parent array identified in the default code field.

When the default code is 255, microprocessor 30 is notified that the present array corresponds to a parent command code set and all the information necessary to generate the square waves that form a signal may be retrieved from the present array. There are eight fields that together provide the information necessary to construct the square waves that may be employed to form the signals corresponding to a command code set. These eight fields are preferably stored in an array corresponding to a parent command code set.

Typically, at least one criteria for selecting a parent array and its corresponding children array is to analyze the shape of logical "1's" and "0's" that are generated pursuant to various command code sets for remotely controlling various devices. For a group of command code sets that have similar signal wave characteristics, information corresponding to such characteristics is stored preferably only in a parent array. The remaining children arrays who require the same logical "1's" and "0's" having the same shape as those of the parent command code set, do not have the necessary information in their appropriate fields. All the command code sets that require the same information in these eight fields, are thus, referred to as a family of command code sets comprising a parent array and a plurality of children arrays. For all command code sets within the same family, microprocessor 30 refers to the parent command code set to generate the logical "1's" and "0's." In one embodiment of the invention, each logical "1" and "0" is formed by a set of pulses having a specific sequence of bits.

The eight fields that correspond to the shape of logical "1's" and "0's" are explained in more detail, hereinafter.

Clock 0 Width (5 Bits) and Clock 1 Width (5 Bits) Fields

The information in these fields indicate the frequency of the infra-red signals that may be generated in conjunction with the present command code set. Each of these two variables may vary from 0 to 31. A value of 31 instructs microprocessor 30 to generate a square wave with the longest period available, and, a value of 0 instructs microprocessor 30 to generate a square wave with the smallest period available. Microprocessor 30, based on the information in these fields, may generate square waves with a period between 9.5 µs and 41.5 µs, in increments of 0.5 µs. It will be appreciated that the present invention is not limited in scope in this respect and square waves with other periods may be generated.

Pulse 1 Width Field (1 Byte)

The information in this field represents the length of a pulse containing a plurality of square waves mentioned above. The value in this field may vary from 0 to 255. This allows 255 periods per each pulse. For example, for infrared signals having a frequency of 40 KHz, the generated square waves have a period of approximately 25 µs. If it is desired that each pulse contain 255 square waves, the total length of each pulse adds to 6.3 ms.

Length of Shape of 1 Field (5 Bits)

In one embodiment of the present invention each signal associated with a command code set comprises a plurality of logical "1's" and "0's." A logical "1" may include a plurality of pulses as explained above. The length of shape of 1 field contains the information regarding the number of pulses that form a logical 1. In this particular embodiment a logical 1 may be represented by a sequence of 32 pulses.

Shape of 1 Field

This field contains a sequence of bits representing a logical "1." For example, for certain type of devices, a logical "1" is represented by a sequence of "1001101." In this example, the length of shape of 1 field is 7. Every time that handset 10 generates a logical "1" for this device, a sequence "1001101" is generated, where each "1" is a pulse having a width represented in pulse 1 width field. This pulse, in turn, modulates a carrier frequency represented by clock0 and clock 1 fields.

Length of Shape of 0 Field (5 Bits) and Shape of 0 Field

The information contained in these fields represent a logical "0" employed by a desired command code set and are similar in form to logical "1" explained above.

Length of Dependent Sequence Field (5 Bits)

A dependent sequence is a set of logical 1's and 0's that are desired to be transmitted in response to a key pressed on handset 10. It will be appreciated that for each remotely controlled device, a different dependent sequence is transmitted in response to a specific key. Furthermore handset 10 generates a different dependent sequence for each key pressed depending on the type or model of the remotely controlled device.

The information contained in the length of dependent sequence field indicates the length of the dependent sequence that is generated in response to a key pressed. In general, all keys corresponding to the same command code set have dependent sequences with the same length. Those keys corresponding to the same command code set that do not have a dependent sequence with the same length may be treated separately. For example a separate array may be formed for those command code sets whose dependent sequence lengths are not the same for all keys pressed.

The fields in an array described up to this point represent generally the information relating to the keys of handset 10, and the way square wave signals and logical "1's" and "0's" may be created. The remaining fields contain "message" information, which represents how each signal in a command code set may be generated in response to a key pressed on handset 10.

Constant Square Wave Code Field (3 Bits)

Certain devices that are desired to be remotely controlled by handset 10 require to receive a constant square wave prior to receiving a signal associated with a command code set employed to control these devices. The constant square wave code field indicates whether prior to or after generation of a signal, or within a signal, it is necessary to transmit a constant square wave to notify the receiving device that a signal will be transmitted. If the array contains a predetermined code, such as "001" in this field, microprocessor 30 will generate a constant square wave.

Length of Constant Square Wave Field (12 Bits)

This field represents the length of a constant square wave that is to be transmitted prior to or after the transmission of a signal, or within a signal, generated in response to a key pressed on handset 10. In one embodiment of the invention, the value in this field may vary between 0 and 4095. A zero value indicates that a constant signal is to be generated until the associated key is no longer pressed. A 4095 value indicates that for a 40 KHZ infra-red signal, a constant square wave of approximately 100 ms is to be generated.

Constant High Level Code (3 Bits)

Certain devices that are desired to be remotely controlled by handset 10 require to receive a delay between two consecutive portions of information transmitted by handset 10. The constant high level code field indicates whether it is necessary to provide a delay in accordance with a desired command code set whose signals are being generated by microprocessor 30. If the array contains a predetermined code, such as "011" in this field, microprocessor 30 will generate a constant high level code delay.

Length of Constant High Level Code (12 Bits)

This field represents the length of a delay necessary between two sets of information transmitted by handset 10. For example, for certain command code sets, a signal is desired to be repeatedly transmitted to a receiving device. The information in the constant high level code determines the delay between the signals. For certain other command code sets, there may be a desire to provide a delay between two portions of information in a signal that is being transmitted. Again the information in the constant high level code indicates the length of delay between the transmissions.

Repetition Code Field (3 Bits)

In certain circumstances when a key on handset 10 is pressed, handset 10 transmits the same signal repeatedly. For example, when handset 10 is functioning in TV mode remotely controlling a TV set, when volume up or volume down keys are pressed, the signal representing these commands is repeatedly sent to the TV set until the key is no longer pressed. The repetition code field is provided to indicate to microprocessor 30 when such repetition is desired. Thus, the repetition code field may contain a predetermined code such as "011", that when present indicates that the remaining fields in the message must be repeated until the key being pressed is no longer pressed.

Simple Sequence Code Field (3 Bits)

In certain circumstances when a key on handset 10 is pressed, handset 10 transmits a preamble formed of a predetermined sequence of bits to prompt the remotely controlled device to receive the actual signal representing a function that can be remotely controlled. The simple sequence code field is provided to indicate to microprocessor 30 when such sequence is desired. Thus, the simple sequence code field may contain a predetermined code such as "100", that when present indicates that a sequence of bits must be transmitted when a key on handset 10 is pressed. Preferably, the simple sequence code does not depend on the key pressed, and, the same simple sequence is generated in response to any of the keys pressed.

Simple Sequence Negation Field (1 bit)

As previously mentioned, certain remotely controlled devices, may receive a message repeatedly when the repetition code field is set with a predetermined code such as "011." There are certain devices that are adapted to receive a negated version of a sequence every time handset 10 sends the sequence. For example, if in a series of repeated transmissions, a sequence "11100011" is first transmitted, the next time that this sequence is transmitted, handset 10 transmits "00011100", which is the negated version of the prior sequence. The simple sequence negation code field is provided to indicate to microprocessor 30 when such negation is desired.

Length of Simple Sequence Field (5 Bits)

This field indicates the length of the simple sequence that must be transmitted by handset 10 in response to a key pressed.

Simple Sequence Field

This field contains the actual sequence of binary bits adapted to be transmitted to a remotely controlled device, in response to a key pressed on handset 10. It will be appreciated that the shape of 1's and 0's transmitted to the remotely controlled device follow the patterns defined in the prior fields, explained above, with respect to characteristics and the shape of pulses representing a logical "1" or a "0."

When it is desired to transmit a preamble simple sequence code, microprocessor 30 generates the appropriate sequence regardless of the key pressed on handset 10. Thus, a preamble sequence code is transmitted in response to any one of the keys pressed on the handset, prior to the transmission of signals, after the signals, or within the signals, that represent the actual command or function that is desired to remotely control.

In certain circumstances it is also desired, in addition to the simple sequence code, to generate a set of signals that are transmitted depending on the key pressed on handset 10. These key-dependent signals are explained in more detail hereinafter.

Dependent Sequence Code Right (3 Bits),
Dependent Sequence Code Left (3 Bits)

For many remotely controlled devices, a series of related keys pressed on handset 10, each generate a sequence that are closely related to each other. For example, when a number key such as zero is pressed, a dependent sequence "0000" may be generated. When a key such as "1" is pressed, a dependent sequence "0001" is pressed and so forth. In one embodiment of handset 10 in accordance with the present invention, instead of storing the dependent sequence for all the numbers, it is desirable to store only one or two dependent sequences corresponding to numbers "0" and "1" respectively. When a number other than "0" or "1" is pressed on handset 10, microprocessor 30 generates a dependent sequence by adding an appropriate amount of "1's" to the dependent sequence representing "0" or "1." It will be appreciated that a considerable amount of memory may be saved by employing this technique.

The dependent sequence code right or left fields indicate whether "1's" must be added to the right side of the dependent sequence that has been actually stored or to its left side. A predetermined code such as "101" indicates that the addition is made to the right side. A predetermined code such as "110" indicates that the addition is made to the left side.

Dependent Sequence Negation Field (1 bit)

The effect of this field is similar to simple sequence negation code field previously explained. Thus, when it is desired to transmit a set of dependent sequences repeatedly, there are certain devices that expect to receive a negated version of the previously received dependent sequence. When this field is set to indicate negation, each transmission of a dependent sequence in a series of repetitions contains the negated version of bits previously transmitted.

Addition Code Field (3 Bits)

The information contained in this field indicates whether a specific type of key has an associated set of dependent sequence bits stored in memory, or whether such dependent sequence may be calculated by employing an appropriate addition function to another dependent sequence of bits stored in memory. For example, the first bit in the code may indicate that dependent sequences corresponding to number keys may be calculated by performing an addition to a dependent sequence representing a "0" number key or a "1" number key. Thus when this bit is set to "1" microprocessor 30 adds an appropriate amount to an already stored dependent sequence and transmits the resultant dependent sequence in response to a number key pressed.

The second bit in addition code field may indicate that dependent sequences corresponding to volume up and volume down keys may be calculated by performing an addition to a dependent sequence representing a specific volume level. Thus when this bit is set to "1" microprocessor 30 adds an appropriate amount to an already stored dependent sequence representing a specific volume level, and, transmits the resultant dependent sequence in response to a volume key pressed.

The third bit in addition code field may indicate that dependent sequences corresponding to channel up and channel down keys may be calculated in a manner substantially similar to that explained in conjunction with volume up and volume down keys.

Existing Keys Field (24 Bits)

These field contains 24 bits of information, where each "set" bit represents a key that is stored in the present command code set. The existing keys for remotely controlling a VCR set may include, play key, fast forward key, rewind key, mute key, volume up key, channel up key, recall key, channel down key, number "0" and number "1" keys, enter key, pause key, stop key, record key, power key and so forth. When it is desired that handset 10 generates a signal in response to any one of these keys, the corresponding bit in existing keys field is set to 1, if that specific key is stored in the current command code set. Thus microprocessor 30 retrieves the information in this field and determines whether it should generate a dependent sequence in response to a key pressed on handset 10.

When addition code for a predetermined type of keys is set to 1, only the dependent sequence corresponding to one of the keys is stored and the dependent sequences corresponding to the remaining related keys may be calculated by performing an appropriate addition. The number of bits set in existing keys field equals the length of dependent sequence generated field divided by length of dependent sequences field.

It will be appreciated that the present invention is not limited in scope in this respect and there may be more or less than 24 bits representing 24 keys in response to which a dependent sequence is generated.

Dependent Sequence Generated Field

The information contained in this field represents the actual dependent sequence for each of the keys represented as "1" in the existing keys field. Thus, after microprocessor 30 determines that a dependent sequence must be generated in response to a key pressed on handset 10, it refers to dependent sequence generated field to determine the actual sequence that must be transmitted in response to the key pressed. The length of this field is variable and depends on the length of the dependent sequence generated in response to a pressed key and the number of keys in response to which a dependent sequence is generated. As mentioned previously, the length of the dependent sequence is stored in the field identified as length of dependent sequence field.

Sequence Repetition Code Field (3 Bits)

In certain circumstances, it is desired to transmit a simple sequence or a dependent sequence several times within the same message that is being transmitted in response to a key pressed. Instead of storing the sequence many times within the message, it is desirable to store a code in sequence repetition code field, such as "111" indicating that handset 10 must generate a simple sequence or a dependent sequence again.

Sequence Repetition Index Field (2 Bits)

This field indicates which one of the simple or dependent sequences previously generated must be generated again. An index "00" indicates that a first set of simple sequences are desired to be generated again. Likewise, an index "01" indicates that a second set of simple sequences previously generated are desired to be generated again. An index "11" indicates that a dependent sequence previously generated needs to be generated again. An index "10" indicates that sequence repetition must be canceled. For example, assume that a parent array includes a sequence repetition code indicating that a sequence must be generated again. If, in the child array, the index in sequence repetition index field is set to "10" microprocessor 30 will not generate a sequence again, when the command code set corresponding to a child array is being executed.

It will be appreciated that microprocessor 30 may generate a sequence of signals for a desired command code set, based on the information contained in a corresponding parent or child array. In operation microprocessor 30 is configured to generate signals for a variety of most popular command code sets relating to most popular commercially available devices.

In order to construct these parent and child arrays, first all signals generated by various remote controllers that control most of the commercially available devices may be analyzed. In accordance with one method for constructing parent and child arrays, a signal analyzer is coupled to the output of different commercially available remote controllers to determine the command code set corresponding to each controller formed by a sequence of signals generated in response to keys pressed on those controllers. These signals are then analyzed either manually or by utilizing a computer program, in order to categorize the command code sets into parent and child command code sets.

In one embodiment in accordance with the present invention, one criteria for determining a parent command code set is the shape and frequency of signals corresponding to logical "1's" and "0's." For a group of command code sets that require the same shape an frequency for logical "1's" and "0's", microprocessor 30 may use one of the command code sets as a parent command code set and the remaining command code sets as a child command code set. The information corresponding to the shape of "1's" and "0's"

will be stored in the parent array corresponding to the parent command code set, and, may not be stored in a child array corresponding to a child command code set. Another criteria for determining which command code set among a group of command code sets may be considered as a parent command code set is the number of common dependent sequences, or any other information, that each command code set has with other command code sets. The command code set with the highest number of dependent sequences common with other dependent sequences with other command code sets may be considered as a parent command code set. For example, assume that TV set A may require the same dependent sequence for "power on" command as TV set B and TV set C. Furthermore TV set A may require the same dependent sequence for "volume up or down" as TV set B. Finally TV set A may require the same dependent sequence for "channel up or down" as TV set C. Thus, TV set A has 3 dependent sequences that are common with either TV sets B or C. TV set B has 2 dependent sequences that are common with either TV sets A or C. Finally, TV set C has also 2 dependent sequences that are common with either TV sets A or B. Thus the command code set corresponding to TV set A will be considered as a parent command code set and all the information necessary to create the signals corresponding to this parent command code set will be stored in a parent array. The information necessary to create the signals corresponding to TV set B and C are then stored in child arrays corresponding to this parent command code set.

It will be appreciated that by employing the encoding technique in accordance with the present invention a considerable amount of memory space may be saved and a compression ratio in the order of 15000 to 1 may be achieved. Furthermore, although the encoding techniques in accordance with the invention has been explained in conjunction with handset 10, base station 25 may conveniently employ the same encoding technique.

Referring back to FIG. 2, sound, including voice, signals and corresponding command or control signals, that are used to modulate a carrier frequency, are received and transmitted via a radio frequency transceiver 50 that contains an antenna 58. These signals may be in analog or digital form. Similarly sound, including voice, and data signals are received and transmitted via an infra-red transceiver 60 that contains detectors and light emitting devices.

A microphone 18 is used to input sound, including voice, and voice commands. A speaker 20 is used to reproduce sound, including voice, and voice commands. A ringer 22 is used to reproduce telephone ringer sounds and pager sounds generated by microprocessor 30. Sound or voice signals received by microphone 18, is recorded and stored by a voice recorder/player integrated circuit 84 under the control of microprocessor 30. Similarly, microprocessor 30 retrieves stored sound signals from voice recorder/player integrated circuit 84, and makes the signal available to speaker 20, radio frequency transceiver 50, and infra-red transceiver 60. A sound or voice signal received by microphone 18, is detected by a voice activated device 86 and processed for pattern recognition. Recognized patterns are translated into digital signals by the voice activated device 86 and input to a microprocessor 30 as external commands.

A sensor 80, mounted on the enclosure surface, generates signals that are coupled to microprocessor 30 for further processing, display and/or transmission via radio transceiver 50 and/or infra-red transceiver 60.

A converter 36 contains a analog to digital (A/D) converter and a digital to analog (D/A) converter. The digital to analog converter converts digital signals to analog signals coupled to radio transceiver 50, speaker 20, ringer 22. The analog to digital converter converts received analog signals for input to microprocessor 30.

A liquid crystal display device 82 receives data signals from microprocessor 30 and converts the data signals for visual display.

A printed circuit board 90, or similar device provides electrical inter-connectivity paths for all of the components. It may also provide a physical platform for mounting the various components.

Figure 3:
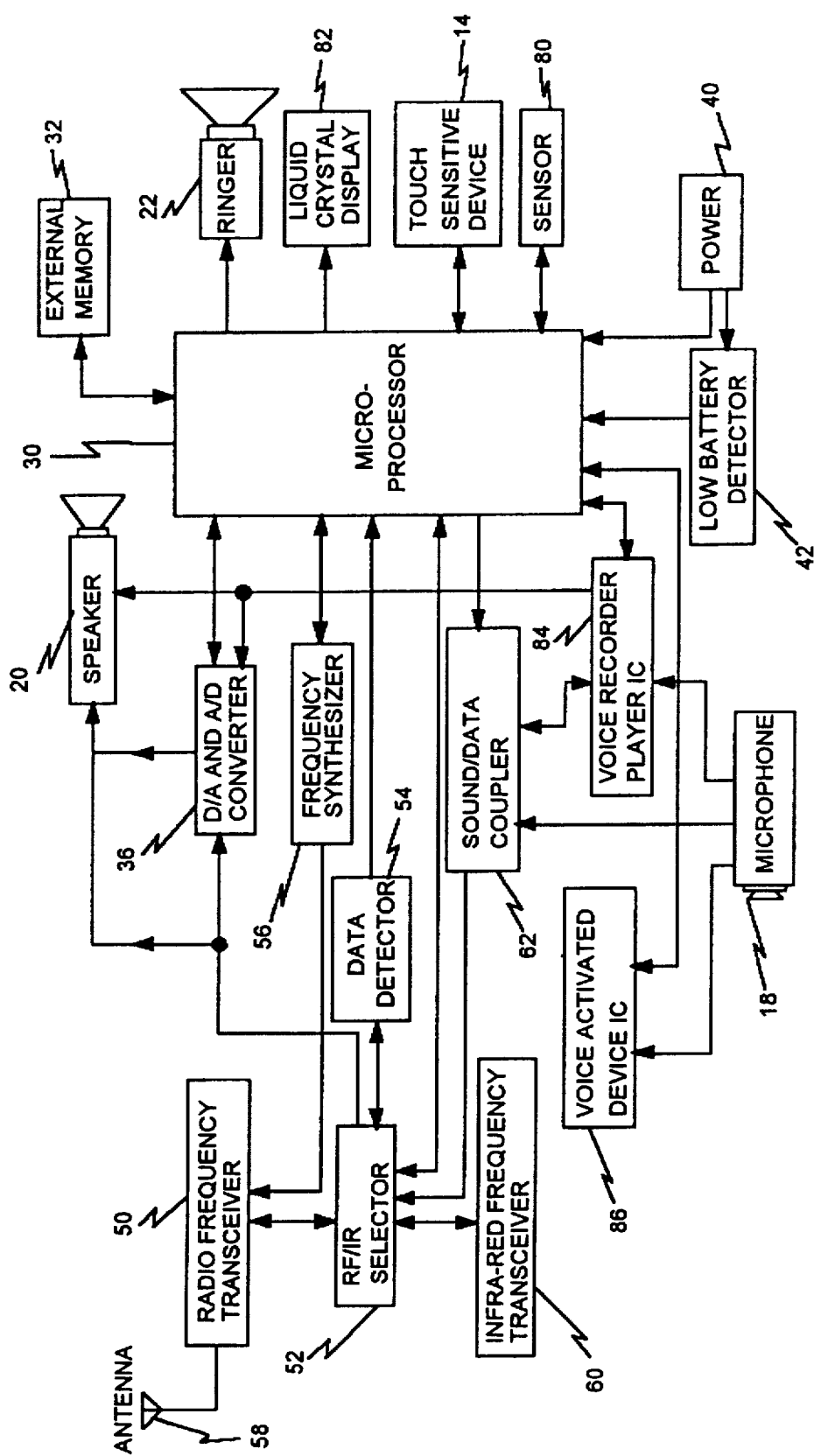
FIG. 3 is a simplified block diagram of FIG. 2 illustrating the handset device in accordance with the present invention.

A power module 40, which may be a rechargeable battery pack, provides the electrical power required by all of the components. Power control is provided by microprocessor 30. The voltage and current selections of power module 40 are based on the intended mode of operation and the size of the apparatus enclosure. Low battery voltage detection is accomplished by a low battery detector 42 (FIG. 3) that is sensitive to the actual battery voltage. At a preset voltage threshold, the detector will send a signal to microprocessor 30, which then takes the appropriate action to activate a light emitting device or to generate a warning signal that is sent to ringer 22 for conversion into a warning sound.

Handset 10 is powered by a power module 40. In one embodiment of handset 10 in accordance with the present invention, a battery save circuit is employed to substantially extend the period that handset 10 may operate without recharging power module 40.

Handset unit 10 has at least two battery operation modes comprising a ringer off mode and a ringer on mode. In the ringer off mode, microprocessor 30 is placed in a "stop" mode, until a key on the handset is pressed, or the handset is placed on base station 25, or some other kind of an external hardware interrupt is generated to activate the microprocessor and to begin its operation. During the stop mode the internal clocks of microprocessor 30 are turned off, and, thus, substantially little current is being consumed by the microprocessor. A typical current consumption during the ringer off mode is approximately 150 μA, which leads to a battery life of over 80 days, if a 300 mAh battery is used.

Figure 4:
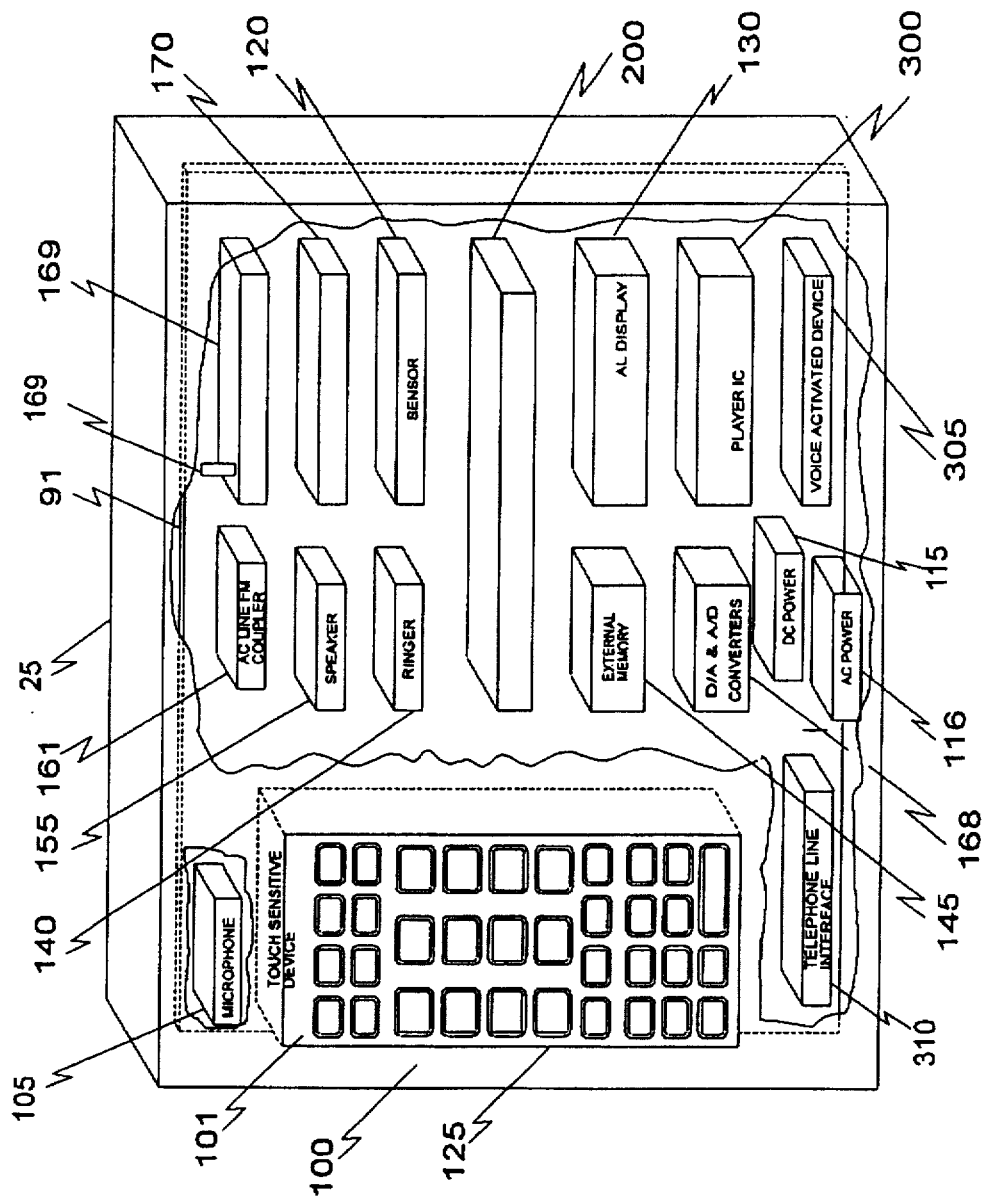
FIG. 4 is a perspective view illustrating the base station device of FIGS. 1a and 1b in accordance with the present invention.

In ringer on mode, handset 10 is configured such that a power signal is provided to microprocessor 30, to allow the microprocessor execute software instructions in response to command signals sent by base station 25 (FIG. 4). However, at least one problem associated with this arrangement is that a radio frequency receiver requires a current signal of approximately 20 mA to function properly. This power consumption leads to a battery life of approximately 15 hours. In accordance with the present invention this battery life may be extended substantially as will be explained in more detail hereinafter.

Figure 7:
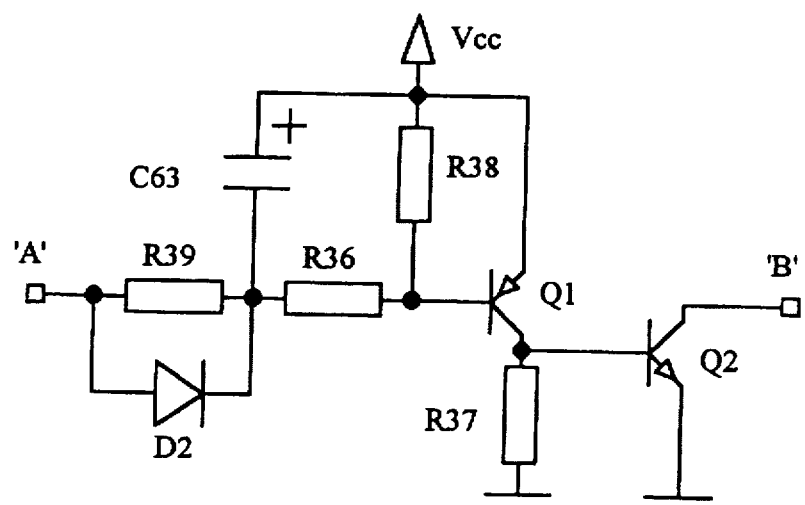
FIG. 7 is a schematic diagram of a battery save circuit in accordance with the present invention.

FIG. 7 illustrates a schematic diagram of a battery save circuit 208 that is employed by handset 10 in accordance with the present invention. An output terminal of microprocessor 30 (not shown) is coupled to terminal 210 of battery save circuit 208. Resistors 212, 220 and 218 couple output terminal 210 to the base of a transistor 222. The emitter of transistor 222 is coupled to power supply voltage signal and to one terminal of a capacitor 216 and to one terminal of resistor 218. The other terminal of capacitor 216 is coupled to a common terminal of resistors 220 and 212. A diode 214 is coupled in parallel to resistor 212. Furthermore the collector of transistor 222 is coupled to a resistor 224 and to the base of a transistor 226. The emitter of transistor 226 is grounded, while its collector is coupled to an external hardware interrupt pin of microprocessor 30 (not shown).

Battery save circuit 208 allows the microprocessor to remain in a stop mode for a predetermined period of time, for example 450 ms. Then it activates the microprocessor for a predetermined duration, such as 50 ms. The microprocessor deactivates itself again for another 450 ms. If during the 50 ms while microprocessor 30 is activated, handset 10 detects an external radio frequency or infra-red signal, it resumes its normal operation. Otherwise microprocessor 30 continues its activation and deactivation cycle continuously.

Microprocessor 30 is adapted to generate a negative transition signal at terminal 210, identified as "A" in FIG. 7 and enter a stop mode. Once this signal with a negative transition is generated, microprocessor 30 turns itself "off" and enters a "stop" mode. The RC network comprising resistors 212, 220, 218 and capacitor 216 provide a 450 ms delay in response to a negative transition signal provided at terminal 210, although the invention is not limited in scope in this respect, and other types of delay circuits may be employed. After the delay period, transistors 222 and 226 turn "on" and a negative transition signal generates at terminal 228, identified as terminal "B" in FIG. 7. Upon detecting this negative transition signal, microprocessor 30 becomes activated. Microprocessor 30 then provides a voltage signal level, $V_{cc}$ at terminal 210 and powers up handset 10 for a predetermined duration, such as 50 ms. Diode D2 provides a positive transition signal at terminal 228, in response to the positive voltage signal level detected at terminal 210. This allows battery save circuit 208 reset at a substantially short period of time, so that it becomes ready to generate a new delay when a new negative transition is sensed at terminal 210.

It will be appreciated that the operation of battery save circuit 208 in accordance with the present invention substantially reduces the use of the battery that powers handset 10.

Figure 8:
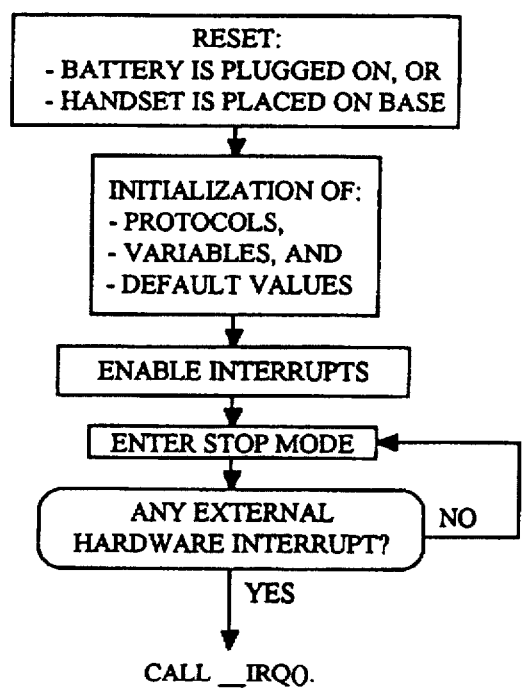
FIGS. 8 and 9 are flow charts illustrating the operation of battery save circuit in connection with the present invention.
Figure 9:
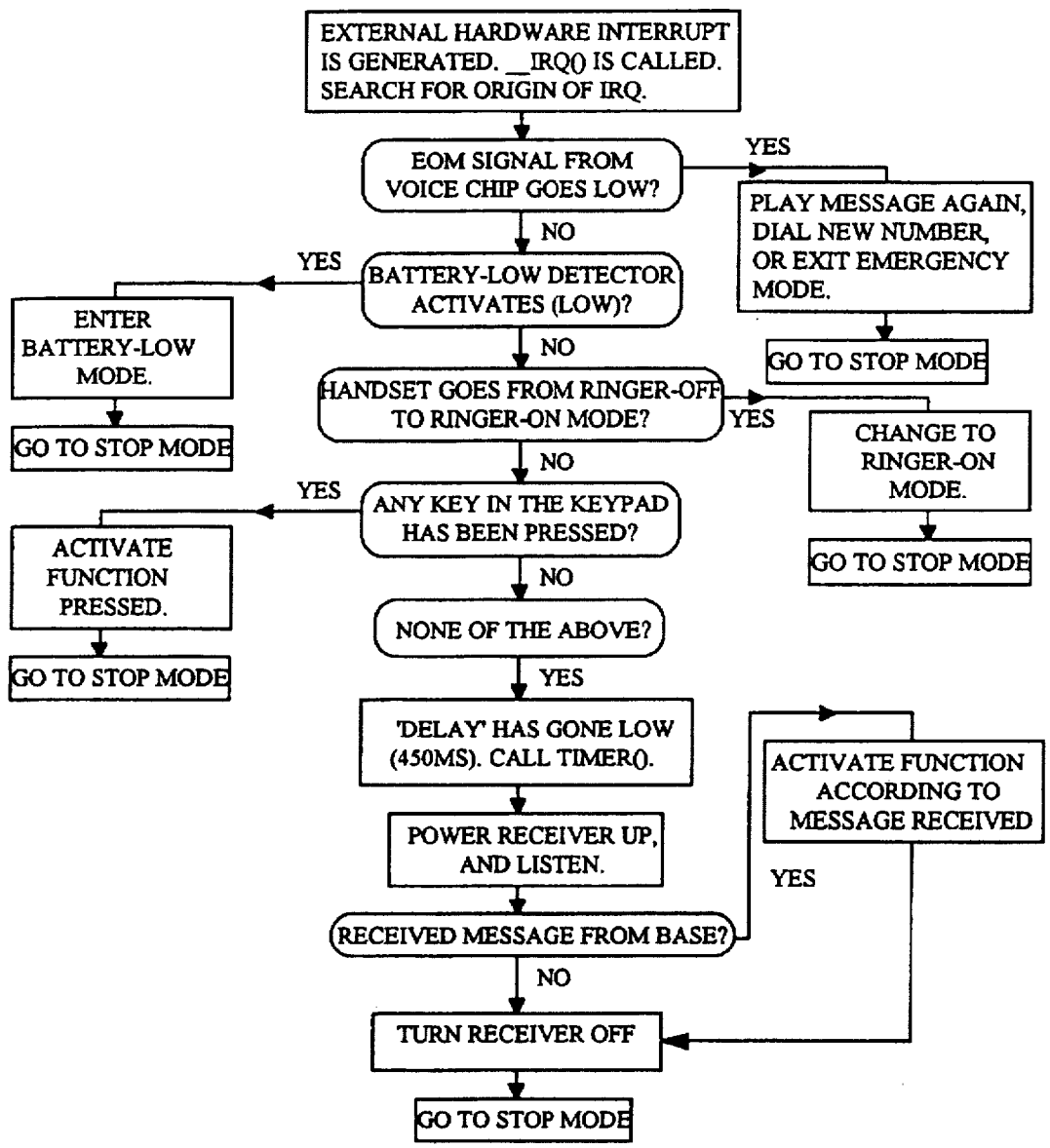

FIGS. 8 and 9 are flow charts illustrating the operation of handset 10 in conjunction with battery save circuit 208. As previously mentioned, handset 10 remains in "stop" mode for a substantial period of time. Preferably, only an external hardware interrupt activates microprocessor 30. Whenever an external hardware interrupt is generated, different interrupt sources are sequentially checked. Once the interrupt source that has generated an interrupt has been identified, a set of predetermined actions are taken and microprocessor 30 returns to "stop" mode again. These predetermined actions may include generating a signal corresponding to a code, in response to a key pressed on handset 10. It may also include a low battery detection procedure, wherein microprocessor 30 enters a battery-low mode, whenever microprocessor 30 detects a power supply voltage signal below a predetermined threshold.

Referring back to FIG. 3 a block diagram of the electronic components illustrated in FIG. 2 is shown, including the component inter-connections of a general wireless communication, command, and sensor device, according to a preferred embodiment of the invention. Touch sensitive device 14 is used to interface with the handset device. By touching any sensitive area, shown as oval shaped areas in FIG. 2, an electrical signal is generated for processing by microprocessor 30. The signal has a logical representation that prompts microprocessor 30 to generate other command and control signals for functions within or external to the apparatus, to make computations, and to generate data or activate communication paths. In response to touch sequences, modes of operation and communication protocols are selected as explained above in reference with FIG. 6. Some of the sequences are punch through operations where a touch screen area may serve as more than one function. Radio frequency operation is accomplished through the use of RF transceiver 50, RF/IR selector 52, microprocessor 30, frequency synthesizer 56, and a phase locked loop circuit. Frequency selection or channel designation and selection is controlled by microprocessor 30. Transmission and reception protocols are contained within microprocessor 30 and are activated based on the mode selection made via touch sensitive device 14. In this manner, handset 10 communicates with any number of external devices having compatible transceivers.

In one embodiment, touching the touch sensitive device 14, in an area labeled "intercom", activates a communication path from microphone 18 to sound/data coupler 62 to RF/IR selector 52 to either radio frequency transceiver 50 or infra-red frequency transceiver 60 to establish a two way communication link with a wireless intercom 2 as shown in FIG 1b. In another embodiment, touching the touch sensitive device 14 area labeled "phone", activates all wireless telephone functions within the device and establishes a remote telephone communication link with a telephone base apparatus 25 as shown in FIG. 1b.

As illustrated in FIG. 1b, in response to sequences pressed on touch sensitive device, handset 10 establishes communication links, through both radio frequency transceiver and infra-red frequency transceiver, to security alarm systems 3, remote alternating current actuators 4, TV 5, VCR 6, cable control boxes 7, sound system 8, remote control sensors 9 and/or other appliances or apparatus 11, such as a home computer. In a more generalized embodiment shown in FIG. 2 the communications handset 10 provides for replacing touch sensitive device 14 label overlay with another overlay 13 and through a program function designating a different set of external apparatus, such as garage door opener. In another embodiment, the combination of touch sensitive device 14, microprocessor 30 and liquid crystal display device 82, or similar display component, and programmable features within the software, pre-programmed icons representing other external apparatus can be displayed for selection in lieu of interchanging the touch sensitive device 14 label overlay 13.

Referring back to FIG. 3, in an intercom embodiment, an external intercom apparatus 2 (See FIG. 1b) generates a control and voice signal that is detected by either radio frequency transceiver 50 or infra-red transceiver 60. The received radio frequency signals are routed by the RF/IR selector 52. The control signal goes to microprocessor 30, via data detector 54. The voice signal goes to the D/A converter 36 for output to speaker 20, or it goes directly to speaker 20. The received infra-red frequency signals are routed by RF/IR selector 52. The control signal goes to microprocessor 30 for processing, including generating a ringer signal, and the voice signal goes to D/A converter 36 for output to speaker 20 or it goes directly to speaker 20. In one embodiment in accordance with the invention base station 25 interacts with handset 10 to perform intercom and paging functions.

In an alarm embodiment, touching a pre-designated area on touch sensitive device 14 (FIG. 1b), generates a signal that is recognized by micro-processor 30 as an alarm signal. The microprocessor generates a command signal, with a specific protocol, that is output to the RP/IR selector 52 for coupling to the radio frequency and/or infra-red frequency transceiver which in turn transmit the appropriate signals. An alarm apparatus 3 equipped with a compatible RF and/or IR detector and signal processor is activated in response to the signal transmitted by radio and/or infra-red frequency transceivers.

In another embodiment a remote alternating current actuator 4 is activated or deactivated to set variable voltage levels by touching the touch sensitive device area labeled "actuator". Through programming and interaction with microprocessor 30 and liquid crystal display 82, or similar device, any number of actuators can be controlled by appropriate assignment of codes.

In a home entertainment embodiment, the combination of touch sensitive device 14, microprocessor 30, embedded software and data base, a control signal path through RF/IR selector 52, infra-red transceiver 60 containing a light emitting device, a remote control function is established for control of TVs 5, VCRs 6, cable boxes 7, sound systems 8 and any other appliance equipped with a compatible receiver. The touch sensitive device 14 has mode and function selection sensitive areas that when touched causes microprocessor 30 to generate the appropriate command and control signals for the appliance. In an alternate embodiment, the interaction with touch sensitive device 14, microprocessor 30 and external programming options, liquid crystal display device 82, or similar device, any number of pre-programmed remote sensors 9 and/or apparatus 11 can be commanded and controlled. In an alternate embodiment infrared transceiver 60 may be used in conjunction with microprocessor 30 to couple and encode infrared control signals generated and transmitted by other remote infrared control devices.

In the telephone embodiment, touch sensitive device 14 area labeled "phone" activates telephone protocols in microprocessor 30 which generates the control signals for accessing base station 25, a cellular cell, or some other apparatus responsive to the control signal. Carrier frequency modulation occurs with transceivers 50 and 60. The microprocessor enables sound/data coupler 62, RF/IR selector 52, frequency synthesizer 56, and radio frequency transceiver 50 or infrared frequency transceiver 60. If radio frequency transceiver 50 is used, the frequency synthesizer 56 generates a carrier signal, under microprocessor control, which is then coupled to the RF transceiver 50. Microphone 18 couples voice to sound/data coupler 62 which links the RF/IR selector 52 and the radio frequency transceiver 50 or the infra-red frequency transceiver 60.

In the voice activated embodiment, voice commands are input via microphone 18 to voice activated device IC 86, which scans the voice signal with a pattern recognition algorithm. Recognized commands are converted into digital signals that then go to microprocessor 30. Microprocessor 30 processes the commands and generates the appropriate command and control signal for internal processing or for transmission via radio frequency transceiver 50 or through infra-red frequency transceiver 60. The voice activated device mode is selected by touching a pre-selected sensitive area on touch sensitive device 14. In a second alternate embodiment, this mode may be selected with voice command input via microphone 18. In an alternate embodiment, this mode is selected through a program menu selection that is accessed via interaction of touch sensitive device 14, microprocessor 30 and the liquid crystal display device 82.

In a voice recorder/player embodiment, sound and/or voice is input via microphone 18 or the radio frequency transceiver 50 or the infra-red frequency transceiver 60 to voice recorder/player IC 84 which has been activated by microprocessor 30 after a mode selection signal has been received from touch screen 14. The sound and/or voice is stored within voice recorder/player IC 84. Upon command by a signal initiated by microprocessor 30, the stored sound or voice is played back through speaker 20 or is sent to sound/data coupler for transmission via the radio frequency transceiver or the infra-red frequency transceiver.

In a sensor embodiment, sensors 80 detect physical phenomena differentials between the sensor and the external physical environment and/or the human skin or some external device brought into contact or close proximity to the sensor. The sensor converts differentials into data signals that are coupled to microprocessor 30. In an alternative embodiment, sensors 9 external to the communications, command, control and sensing handset device may be interrogated via radio frequency transceiver 50 or infra-red frequency transceiver 60 and then coupled to microprocessor 30. The microprocessor in conjunction with touch sensitive device 14 and liquid crystal display device 82 interactively perform a monitoring function. In one embodiment, the microprocessor performs logical and/or computational functions generating a command and/or control signal that is sent back to remote sensor to perform a corresponding function.

One such sensor, for example, detects pressure differentials created by human heart which can then be converted into a heart beat rate per unit of time. Menu selection for each sensor is accomplished by the interaction of touch sensitive device 14, microprocessor 30 and liquid crystal display device 82. In one embodiment sensor 80 is a plug-in component that can be replaced by other sensing components making different measurements such as temperature, molecular degassing, and the like. Algorithms within microprocessor 30, matching the type of sensor, perform appropriate conversions for display on liquid crystal display device 82 or for transmission as radio frequency signals or infra-red frequency signals. These signals may be transmitted to a medical facility or to an environment monitoring and control center.

Figure 5:
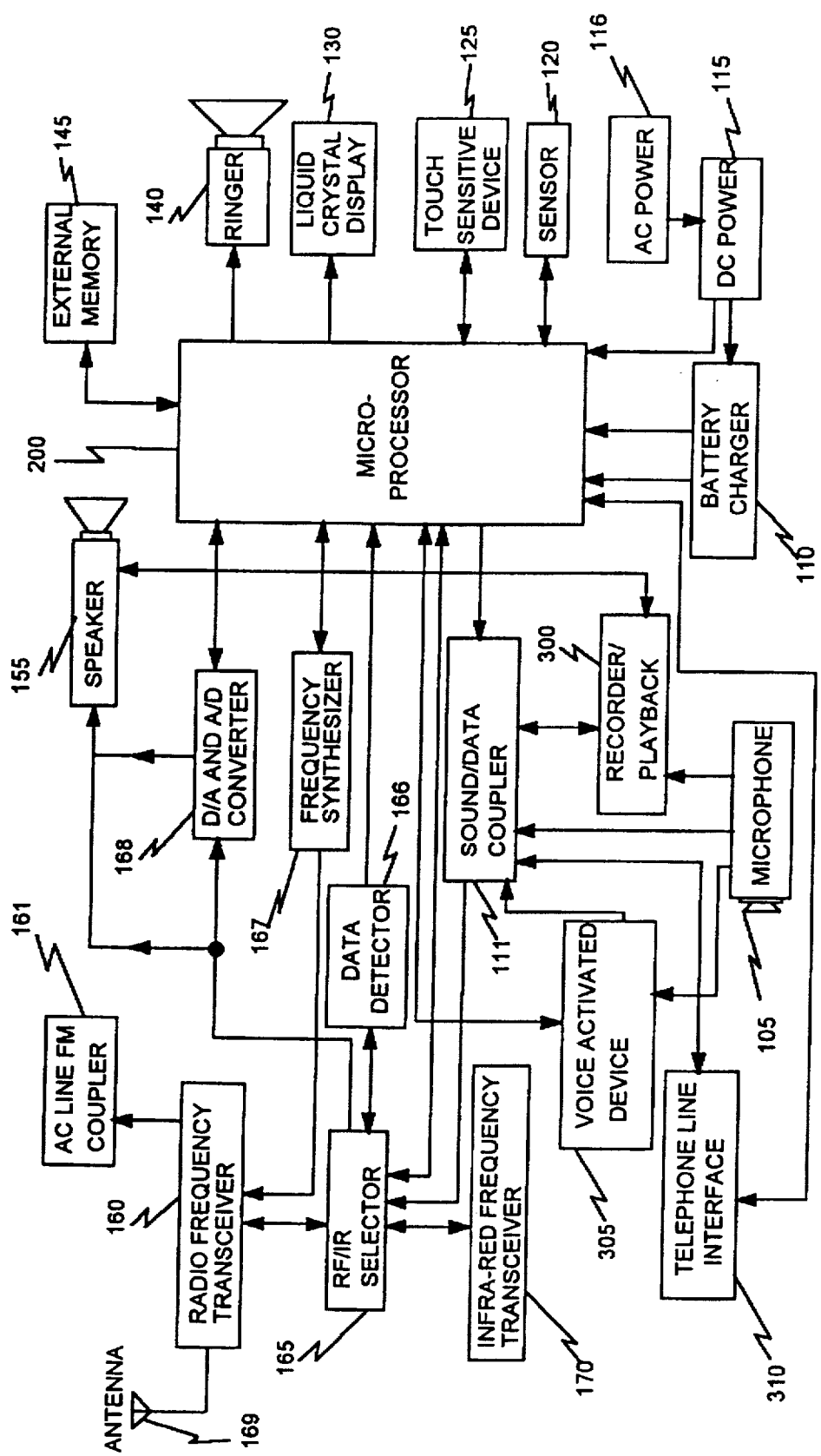
FIG. 5 is a simplified block diagram illustrating the base station device in accordance with the present invention.

FIG. 5 is a block diagram of the electronic components comprising base station 25 which performs substantially the same functions as handset 10. However, base station 25 may employ at least three additional functions, such as: coupling the wireless and wired communications, command, control and sensing system to a telephone line a telephone line interface 310; coupling FM signals to and from the AC power line with an AC line FM coupler 161; and providing AC power via an AC power supply 116 for operating the base station and charging the handset battery with charger 115. The base station microprocessor 200 is preferably a Motorola 6508 microprocessor and includes an external memory 145 to provide an additional means for storing programs and data for controlling the base station or for executing other software applications. Touch sensitive device 125 is used to interface with the base station.

By touching any touch sensitive device area an electrical signal is generated for processing by microprocessor 200. The signal has a logical representation that prompts microprocessor 200 to generate other command and control signals for functions within or external to the base station, to make computations, and to generate data or activate communication paths. In response to touch sequences, modes of operation and communication protocols are selected. Some of the sequences are punch through operations where a touch sensitive device area serves to perform more than one function.

Radio frequency transceiver 160 and RF/IR selector 165, frequency synthesizer 167, a phase locked loop circuit (not shown) and an antenna 169 collectively provide RF operation. Frequency selection or channel designation and selection is controlled by microprocessor 200. Transmission and reception protocols are governed by microprocessor 200 and are activated based on the mode selection made via touch sensitive device 125. In this manner, base station 25 communicates with any number of external devices having compatible transceivers.

As illustrated in FIGS. 4 and 1b, in response to sequences pressed on touch sensitive device 125, the base station can also establish communication links, through both radio frequency transceiver 160 and infra-red frequency transceiver 170, to external devices, such as remote alternating current actuators 4, TV 5, VCR 6, cable control boxes 7, sound system 8, or remote sensors 9 and/or any other apparatus 11. Referring to FIG. 4, in a more generalized embodiment, the base station provides for replacing label overlay 101 on the touch sensitive device 125 with another overlay. Through a program function, a different set of external apparatus, such as garage door opener, can then be controlled via the touch sensitive device 125. In another embodiment, pre-programmed icons representing other external apparatus can be displayed on liquid crystal display device 130 in lieu of interchanging label overlays on to touch sensitive device 125.

In one embodiment, touching the touch sensitive device 125 in an area labeled "intercom," activates a communication path from microphone 105 to sound/data coupler 111 to RF/IR selector 165 to either radio frequency transceiver 160 to antenna 169 or infra-red frequency transceiver 170 to establish a two way intercom communication link between handset 10 and base station 25 as shown in FIGS. 1a and 1b. In an external intercom embodiment, an external intercom apparatus 2 generates a control and voice signal that is detected by either radio frequency transceiver 160 or infra-red transceiver 170. The received radio frequency signals are routed to RF/IR selector 165. The control signal is then routed to microprocessor 200, via data detector 166. The voice signal is either routed to D/A converter 168 for output to speaker 155 or directly to speaker 155. Similarly, received infra-red frequency signals are routed to RF/IR selector 165. The control signal is routed to microprocessor 200 and the voice signal is routed either to D/A converter 168 for output to speaker 155 or directly to speaker 155. Ringer and alert signals are generated by the microprocessor in response to received data and/or software commands and are coupled to the ringer 140. In an alternative embodiment in accordance with the invention external intercom function may be initiated by handset 10. This intercom function may be employed in a paging operation.

In an alarm embodiment, touching a pre-designated area on touch sensitive device 125, labeled "alarm", generates a signal that is recognized by microprocessor 200 as an alarm signal. The microprocessor generates a command signal, with a specific protocol, that is outputted to the RF/IR selector 165 for coupling to the radio frequency and/or infra-red frequency transceiver which in turn transmit the appropriate signals. An alarm apparatus 3 equipped with a compatible RF and/or IR detector and signal processor is activated in response to the signal transmitted by radio and/or infra-red frequency transceivers.

In another embodiment, a remote alternating current actuator 4 is activated and deactivated by touching the touch sensitive device area labeled "actuator". Through programming and interaction with microprocessor 200 and liquid crystal display 130, or similar device, any number of actuators can be commanded by appropriate assignment of codes.

In a home entertainment embodiment, the combination of touch sensitive device 125, microprocessor 200, embedded software and data base, a control signal path through RF/IR selector, infra-red transceiver 170 containing a light emitting device, a remote control function is established for control of TV 5, VCR 6, cable boxes 7, sound systems 8, and any other appliance or apparatus 11 equipped with a compatible receiver. The touch sensitive device 125 has mode and function selection sensitive areas that when touched cause microprocessor 200 to generate the appropriate command and control signals for the appliance as explained in detail in reference with FIG. 6. In an alternate embodiment, the interaction with touch sensitive device 125, microprocessor 200 and external programming options, liquid crystal display 130, or similar device, any number of pre-programmed appliances can be commanded and controlled.

In a telephone embodiment, touch sensitive device 125 activates telephone protocols in microprocessor 200. In response, microprocessor 200 generates the control signals for accessing the telephone line via the telephone line interface 310, the handset, a cellular cell, or some other apparatus responsive to the control signal. The microprocessor enables sound/data coupler 111, RF/IR selector, frequency synthesizer 167, and radio frequency transceiver 160 or infra-red frequency transceiver 170. If the radio frequency communications link is to be used, the frequency synthesizer 167 generates a carrier signal, under microprocessor control, which is then coupled to the RF transceiver 160. Microphone 105 couples voice to sound/data coupler 111 which links the RF/IR selector 165 and the radio frequency transceiver 160 or the infra-red frequency transceiver 170. The telephone line interface 310 provides the hook relay control, ring detector, cable adapter and dual tone multiple frequency (DTMF) signal. In this manner the base station 25 also performs as an RF and/or IR sound, voice and data repeater station for the handset 10. In a repeater embodiment the base station receives and retransmits signals from the handset or from other external apparatus.

In a voice activated embodiment, voice commands are input via microphone 105 to voice activated device IC 305, which scans the voice signal with a pattern recognition algorithm. Recognized commands are converted into digital signals that then go to microprocessor 200. Microprocessor 200 processes the commands and generates the appropriate command and control signal for internal processing or for transmission via radio frequency transceiver 160 or through infra-red frequency transceiver 170. The voice activated device mode is selected by touching a pre-selected sensitive area on touch sensitive device 125. In an alternate embodiment, this mode is selected through a program menu selection that is accessed via interaction of touch sensitive device 125, microprocessor 200 and the liquid crystal display device 130.

In a voice recorder/player embodiment, sound and/or voice is input via microphone 105 or via the radio frequency transceiver 160 or the infra-red receiver 170 to voice recorder/player IC 300 which has been activated by microprocessor 200 after a mode selection signal has been received from touch sensitive device 125. The sound and/or voice is stored within voice recorder/player IC 300. Upon command by a signal initiated by microprocessor 200, the stored sound or voice is played back through speaker 155 or is sent to sound/data coupler for transmission via the radio frequency transceiver or the infra-red frequency transceiver.

In a sensor embodiment, sensors 120 detect physical phenomena differentials between the sensor and the external physical environment and/or the human skin or some external device brought into contact or close proximity to the sensor. The sensor converts differentials into data signals that are coupled to microprocessor 200. One such sensor, for example, detects pressure differentials created by human heart which can then be converted into the heart beat rate per unit of time. Menu selection for each sensor is accomplished by the interaction of touch sensitive device 125, microprocessor 200 and liquid crystal display device 130. In one embodiment, sensor 120 is a plug-in component that can be replaced by other sensing components making different measurements such as temperature, molecular degassing, and the like. Algorithms within microprocessor 200, matching the type of sensor, perform appropriate conversions for display on liquid crystal display device 130 or for transmission as radio frequency signals or infra-red frequency signals. These signals may be transmitted to a medical facility or to an environment monitoring and control center. In an alternative embodiment, sensors external to the communications, command, control and sensing base station 10 can be interrogated via the radio frequency transceiver 160 or infra-red frequency transceiver 170 and are then coupled to microprocessor 200. The microprocessor in conjunction with touch sensitive device 125 and liquid crystal display device 130 interactively perform a monitoring function. In one embodiment, the base station 25 performs logical and/or computational functions generating a command and/or control signal that is sent back to remote sensor to perform a corresponding function. In another embodiment the base station sends said signals to the handset 10 or other apparatus such as a personal computer for display or further processing.

In another base station embodiment, frequency modulated signals are coupled to the alternating current power line for communication with external apparatus and/or appliances.

Base station power is provided both with a backup battery pack 115 and by direct connection to an alternating current source 116. The alternating current source is further used to charge the handset battery. A battery charger 110 provides the means for charging the handset battery and the battery within the base station 25.

It will be appreciated that the wireless and wired communications, command, control and sensing system 1 for sound, voice and/or data transmission and reception is particularly useful in combination with home or business office appliances; such as intercoms, alarm systems, house light actuators, pagers, emergency communication systems, cordless telephone, cellular base stations, televisions, VCRs, sound systems, cable boxes, garage door openers, personal security devices, personal computers, human health monitors and other devices capable of receiving sound, voice, data and/or command and control signals in radio or infra-red frequencies.

Although the invention has been described in connection with various preferred embodiments, those skilled in the art will appreciate that numerous modifications and adaptations may be made without departing from the spirit and scope of the invention as set forth in the following claims.

What is claimed is:

1. A communications, command, control and sensing system for communicating with a plurality of external devices comprising:

a microprocessor for generating a plurality of control signals used to operate said system, said microprocessor creating a plurality of reprogrammable communication protocols, for transmission to said external devices wherein each communication protocol includes a command code set that defines the signals that are employed to communicate with each one of said external devices;

a memory device coupled to said microprocessor configured to store a plurality of parameter sets retrieved by said microprocessor so as to recreate a desired command code set, such that the memory space required to store said parameters is smaller than the memory space required to store said command code sets;

a user interface coupled to said microprocessor for sending a plurality of signals corresponding to user selections to said microprocessor and displaying a plurality of menu selections available for the user's choice, said microprocessor generating a communication protocol in response to said user selections; and an infra-red frequency transceiver coupled to said microprocessor for transmitting to said external devices and receiving from said external devices, infra-red frequency signals in accordance with said communications protocols.

2. The communication, command, control and sensing system of claim 1 further comprising:

a radio frequency transceiver coupled to said microprocessor for transmitting to said external devices and receiving from said devices, radio frequency signals at variable frequencies within a predetermined frequency range and in accordance with said communication protocols; and a selector controlled by said microprocessor for enabling said radio frequency transceiver and said infra-red frequency transceiver to transmit a desired command code set generated by said microprocessor via either radio frequency signals and infra-red signals as desired, and to receive a signal from any one of said external devices via either radio frequency signals and infra-red signals.

3. The communications command, control and sensing system of claim 2 wherein said user interface further comprises:

a touch sensitive device generating a plurality of signals in response to actuation and a display device for displaying messages generated by said microprocessor.

4. The communications command, control and sensing system of claim 3, wherein said microprocessor generates user selectable graphical icons for display on said display device.

5. The communications, command, control and sensing system of claim 4, wherein said touch sensitive device is a touch screen having a plurality of replaceable icon sets, wherein each set is configured to be displayed on said touch screen so as to designate a desired set of functions to each one of said icon sets.

6. The communications, command, control and sensing system of claim 1, further comprising a sound activated device coupled to said microprocessor, said sound activated device used to recognize sound signals including sound commands corresponding to executable logical commands, said sound activated device generating signals in response to recognized sound signals for further processing by said microprocessor.

7. The communications command, control and sensing system of claim 6, further comprising a sound and data coupling device adapted to receive sound as data signals.

8. The communications, command, control and sensing system of claim 6, further comprising a sound recorder and playback device coupled to said microprocessor, said sound recorder and playback device used for recording sound signals, said microprocessor responding to said recorded sound signals at a later time.

9. The communications, command, control and sensing system of claim 8, further comprising a speaker coupled to said voice recorded and playback device for playing back said recorded user generated signals, in response to a control signal generated by said microprocessor.

10. A handset and a base station employed in a communications, command, control and sensing system for communicating with a plurality of external devices, said handset and base station each comprising:

- a microprocessor for generating a plurality of control signals used to operate said system, said microprocessor creating a plurality of communication protocols for transmission to said external devices, each protocol containing a plurality of control signals used to interface with an external device, wherein each communication protocol includes a command code set that defines the signals that are employed to communicate with each one of said external devices;
- a memory device coupled to said microprocessor configured to store a plurality of parameter sets retrieved by said microprocessor so as to recreate a desired command code set, such that the memory space required to store said parameters is smaller than the memory space required to store said command code sets;
- a user interface coupled to said microprocessor for sending a plurality of signals corresponding to user selections to said microprocessor, and displaying a plurality or menu selections available for user's choice, said microprocessor generating a communication protocol in response to said user selections;
- a radio frequency transceiver coupled to said microprocessor fro transmitting to said external devices and receiving from said external devices, radio frequency signals at variable frequencies within a predetermined frequency range and in accordance with said communication protocols;
- an infra-red frequency transceiver coupled to said microprocessor for transmitting to said external devices and receiving from said external devices infra-red frequency signals in accordance with said communications protocols;
- a selector controlled by said microprocessor for enabling said radio frequency transceiver and said infra-red frequency transceiver, to transmit a desired command code set generated by said microprocessor via either radio frequency signals and infra-red signals as desired, and to receive a signal from any one of said external devices via either radio frequency signals and infra-red signals; and
- a data detector coupled to said selector for receiving signals transmitted from each one of said external devices, said data detector providing control signals received from said external devices to said microprocessor.

11. The communications command, control and sensing system of claim 10 wherein said user interface further comprises:

- a touch sensitive device generating a plurality of signals in response to pressure exerted in various portions of said device; and
- a display device for displaying messages generated by said microprocessor.

12. The communication, command, control and sensing system of claim 10, wherein said base station is coupled to at least one telephone line via a telephone line interface.

13. The communications, command, control and sensing system of claim 10 wherein said base station is adapted to couple frequency modulated signals to an alternating current power line.

14. The communications, command, control and sensing system of claim 10 wherein said base station further comprises a backup battery power source.

15. The communications, command, control and sensing system of claim 11, wherein said microprocessor generates user selectable graphical icons for display on said display device.

16. The communications, command, control and sensing system of claim 15, wherein said touch sensitive device is a touch screen having a plurality of replaceable icon sets, so as to designate a desired set of functions to each one of said icon sets.

17. The communications command, control and sensing system of claim 10, further comprising a voice activated device coupled to said microprocessor, said voice activated device used to recognize predetermined voice commands, said voice activated device generating signals in response to recognized voice commands for further processing by said microprocessor, said voice activated device further coupled to said selector for directly providing voice signals for transmission by one of said transceivers.

18. The communications, command, control and sensing system of claim 17, further comprising an internal and an external intercom device, so as to provide voice and data communications among said base station, said handset and external intercom devices.

19. The communications, command, control and sensing system of claim 18, further comprising a voice recorder and playback device coupled to said microprocessor, said voice recorder and playback device used for recording user generated voice signals, said microprocessor retrieving said recorded user generated signals at a later time, said voice recorder and playback device coupled to said selector for directly providing voice signals for transmission by one of said transceivers.

20. The communications, command, control and sensing system of claim 19, further comprising a speaker coupled to said voice recorder and playback device for playing back said recorded user generated signals, in response to a control signal generated by said microprocessor, said speaker further coupled to said selector for reproducing voice signals received by one of said transceivers.

21. The communications, command, control and sensing system of claim 20, wherein said data detector further comprises:

- means for detecting digital data;
- means for discriminating voice signals from control signals received from said selector; and
- means for providing said control signals to said microprocessor.

22. The communications command, control and sensing system of claim 21, further comprising a ringer coupled to said microprocessor, said ringer generating a telephone ring, a pager ring and rings associated with warning signals generated by said microprocessor.

23. The communications command, control and sensing system of claim 10, further comprising at least one sensor located on either of said handset and base station, said sensor coupled to said microprocessor for detecting and measuring physical phenomena.

24. The communications, command, control and sensing system of claim 23 further comprising an AC actuator system wherein said actuator is adapted to be remotely activated or deactivated so as to control external apparatus.

25. The communications, command, control and sensing system of claim 23, further comprising an external alarm system, wherein said user interface generates a signal corresponding to an alarm indication, said microprocessor generates a command signal having a corresponding protocol, for transmission to said external alarm system, said external alarm system activated in response to said protocol.

26. The wireless communications command, control and sensing system of claim 23, further comprising a plurality of home entertainment systems, wherein said user interface generates a plurality of signals corresponding to each of said entertainment systems, said microprocessor generates a command signal having a corresponding protocol associated with each one of said entertainment systems, for transmission to said entertainment systems, said entertainment systems communicating with said communications command, control and sensing system.

27. The communications, command, control and sensing system of claim 1 wherein one of said parameter sets stored corresponding to one of said command code sets is accessible for use so as to create other command code sets.

28. The communications, command, control and sensing system of claim 27, wherein said microprocessor is configured to concurrently generate more than one command code sets so as to allow said user interface to control more than one corresponding external devices among said plurality of external devices.

29. The communications, command, control and sensing system of claim 1, further comprising a sensor coupled to said microprocessor for detecting and measuring physical phenomena corresponding to said user.

30. The communications, command, control and sensing system of claim 29 wherein said sensor measures said user's physical indications.

31. The communications, command, control and sensing system of claim 23 wherein said physical phenomena corresponds to said user.

32. The communications, command, control and sensing system of claim 31 wherein said physical phenomena is measured in response to said user's skin contact with said sensor.

33. The communications, command, control and sensing system of claim 31 wherein said physical phenomena includes said user's heart bit and temperature.

34. A communications, command, control and sensing system for communicating with a plurality of external devices comprising:

a microprocessor for generating a plurality of control signals used to operate said system, said microprocessor creating a plurality of reprogrammable communication protocols for transmission to said external devices wherein each communication protocol includes a command code set that defines the signals that are employed to communicate with each one of said external devices;

a memory device coupled to said microprocessor configured to store a plurality of parameter sets retrieved by said microprocessor so as to recreate based on said parameter sets a desired set of pulse signals corresponding to logical "1's" and "0's" as specified by a command code set;

a user interface coupled to said microprocessor for sending a plurality of signals corresponding to user selections to said microprocessor and displaying a plurality of menu selections available for the user's choice, said microprocessor generating a communication protocol in response to said user selections; and an infra-red frequency transceiver coupled to said microprocessor for transmitting to said external devices and receiving from said external devices, infra-red frequency signals in accordance with said communications protocols.

* * * * *